Figure 9:
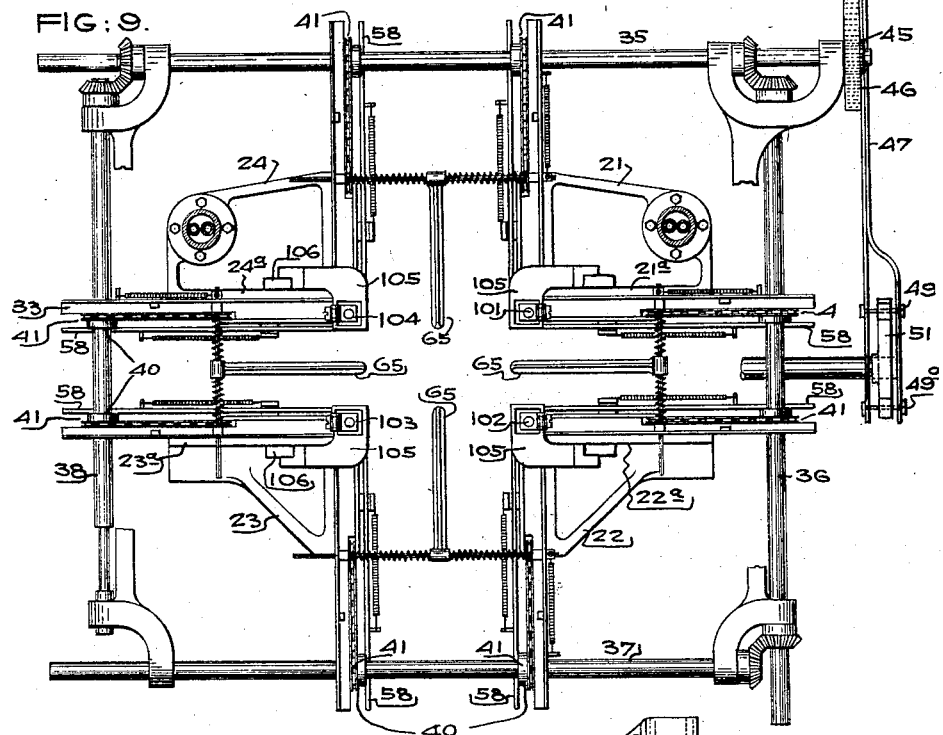

R. C. NEFF.
BOX MAKING MACHINE.
APPLICATION FILED APR. 23, 1914.
1,305,398.
Patented June 3, 1919.
13 SHEETS—SHEET 1.
FIG: 1
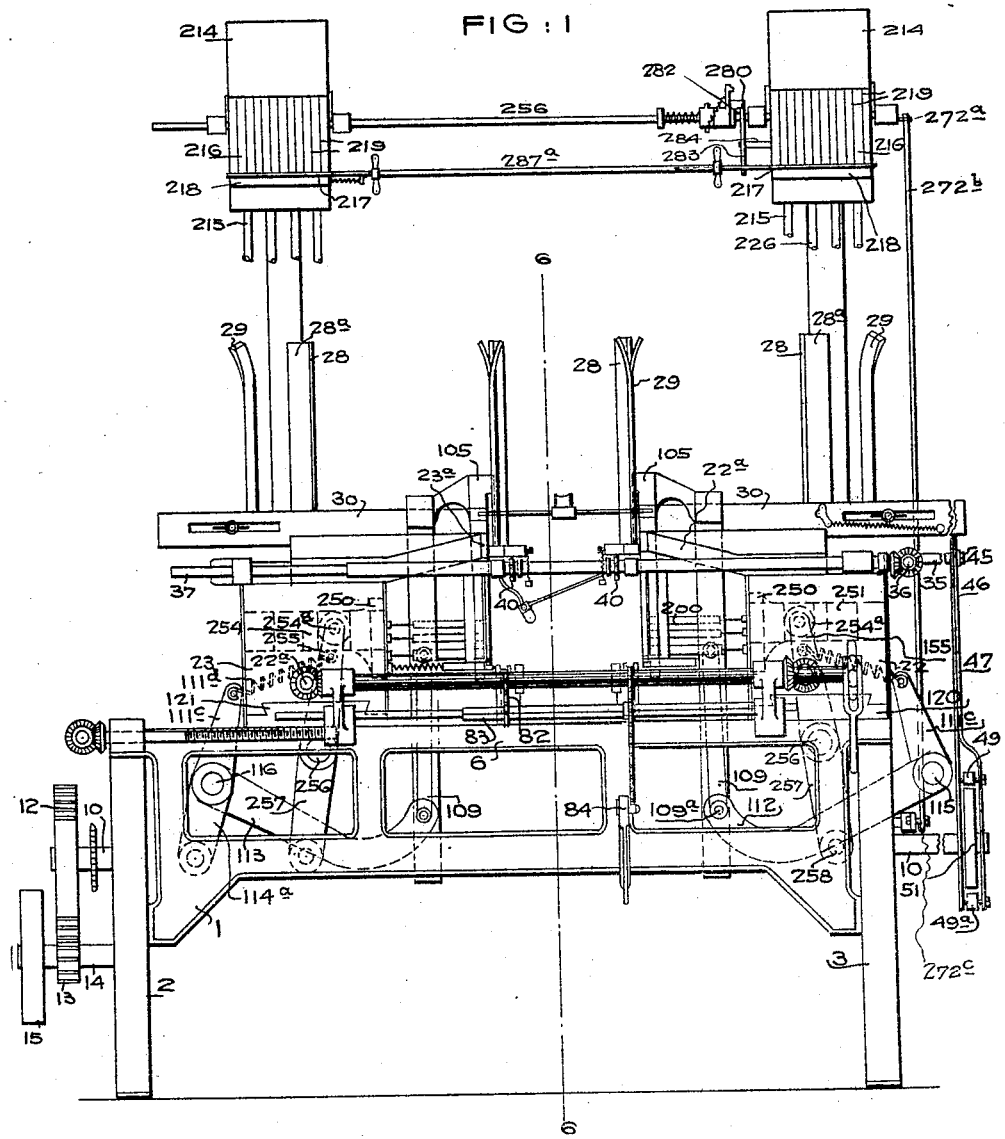
Robert C. Neff,
INVENTOR
WITNESSES:
BY
ATTORNEY

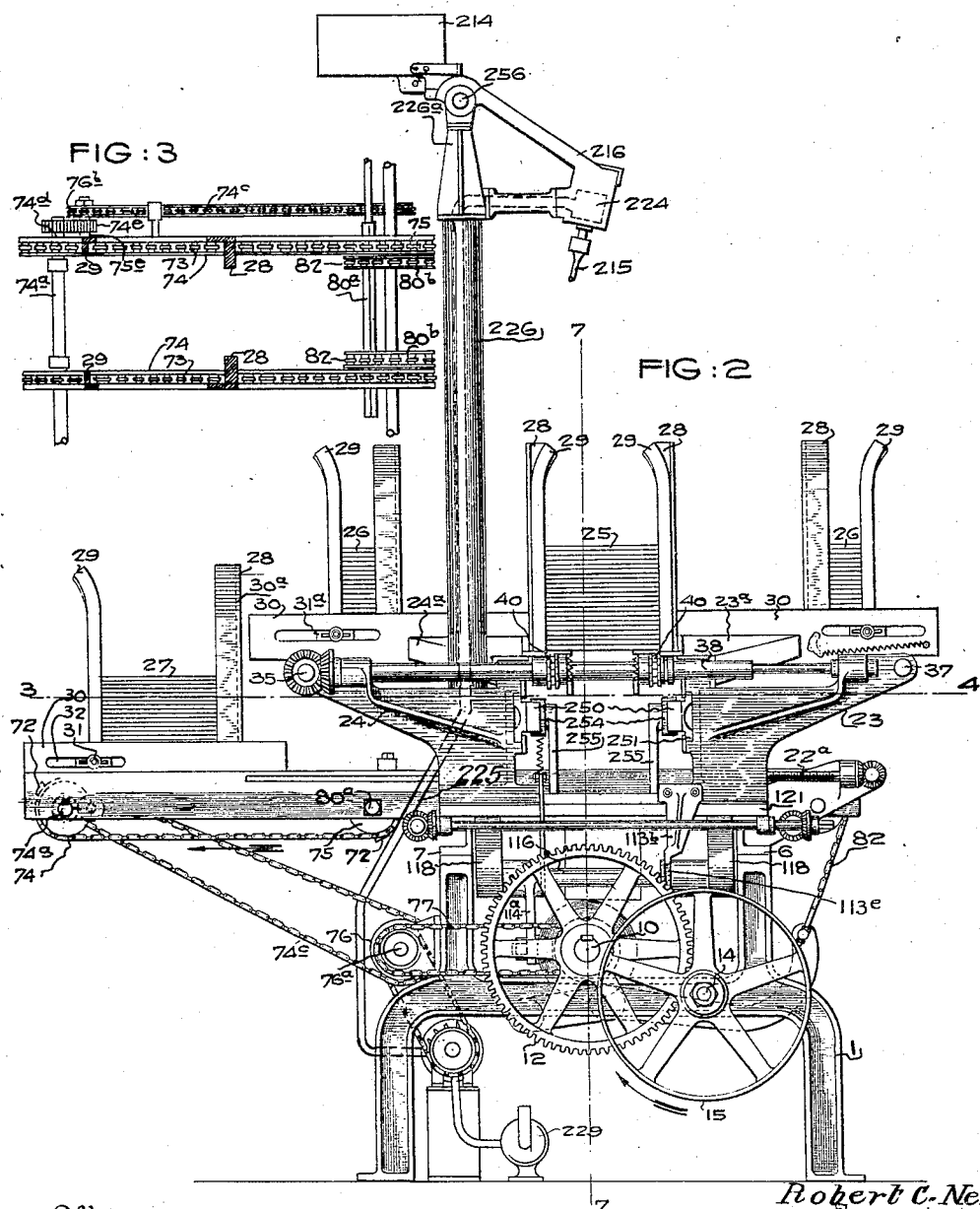

R. C. NEFF.
BOX MAKING MACHINE.
APPLICATION FILED APR. 23, 1914.
1,305,398.
Patented June 3, 1919.
13 SHEETS—SHEET 3.
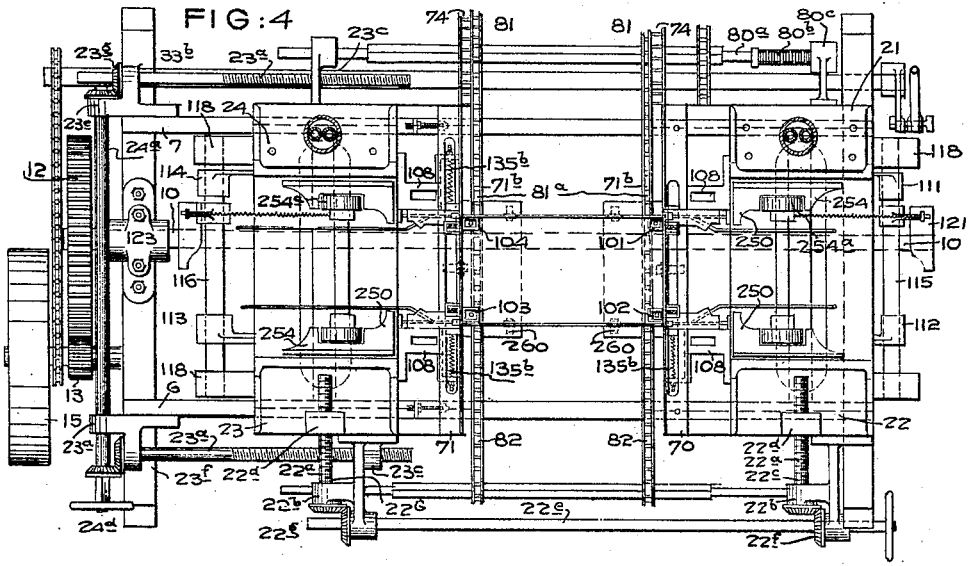
FIG: 4
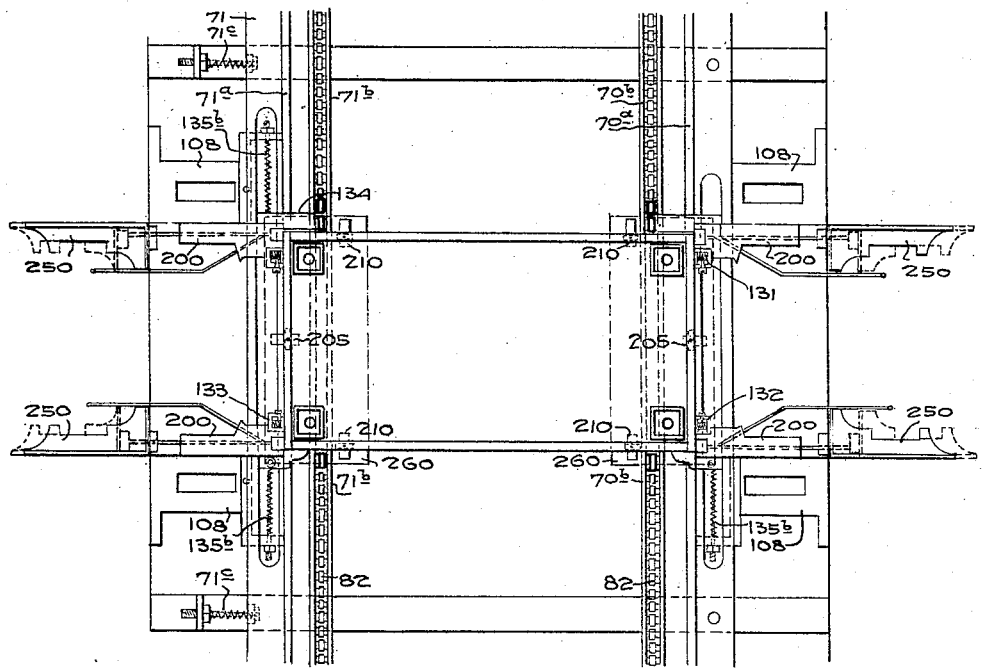
FIG: 5
Witnesses
Robert C. Neff
Inventor
By his Attorney

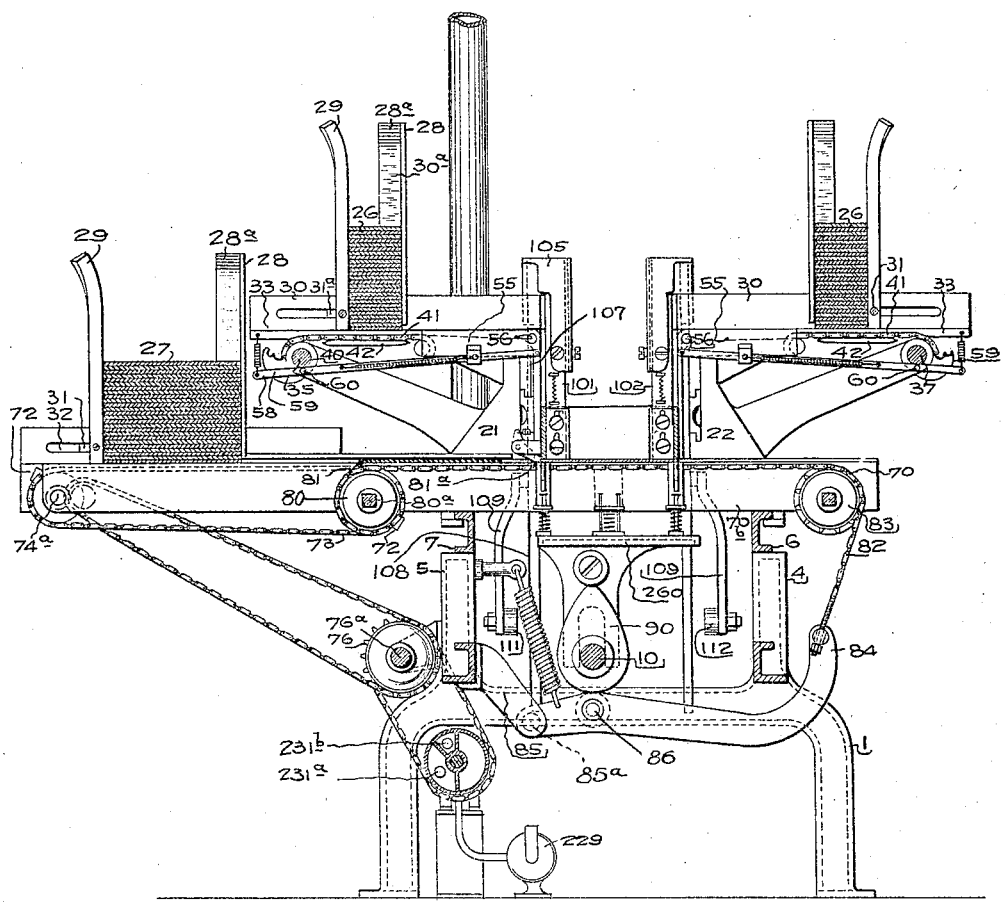

R. C. NEFF.
BOX MAKING MACHINE.
APPLICATION FILED APR. 23, 1914.
1,305,398.
Patented June 3, 1919.
13 SHEETS—SHEET 5.
FIG: 7.
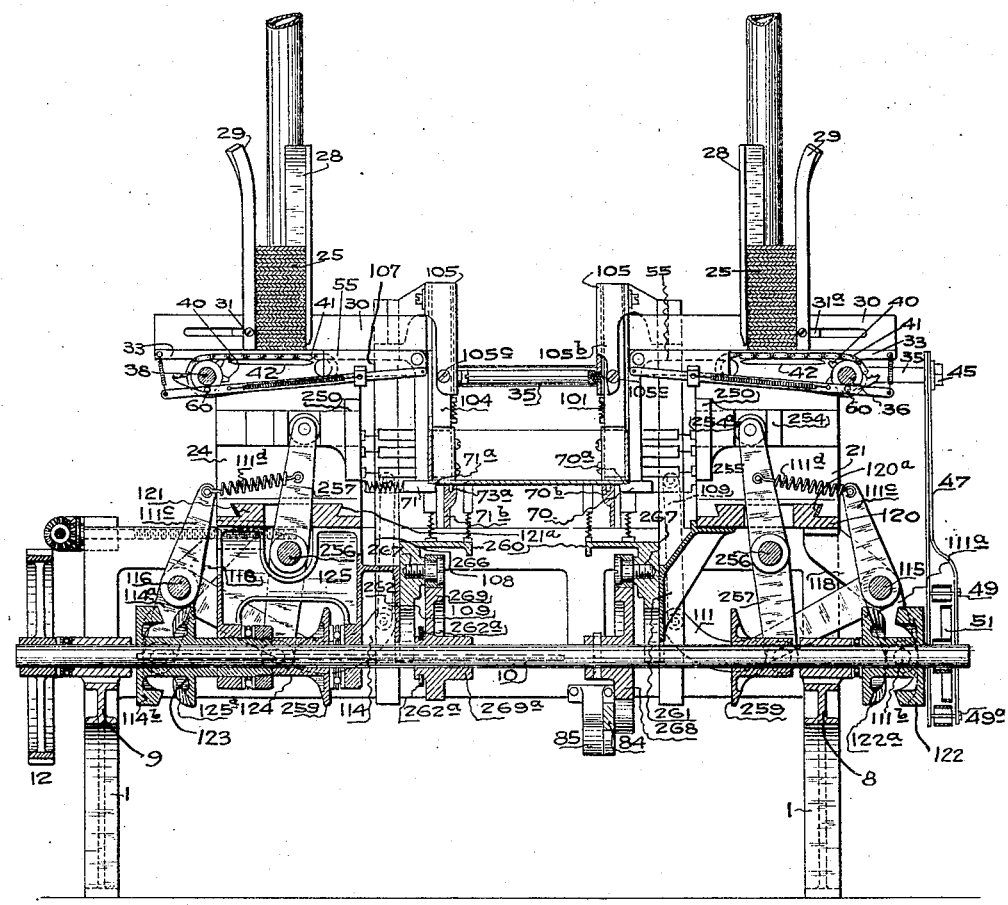
FIG: 8.
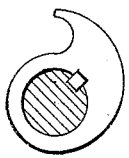
FIG: 8ª.
Robert C. Neff,
Inventor

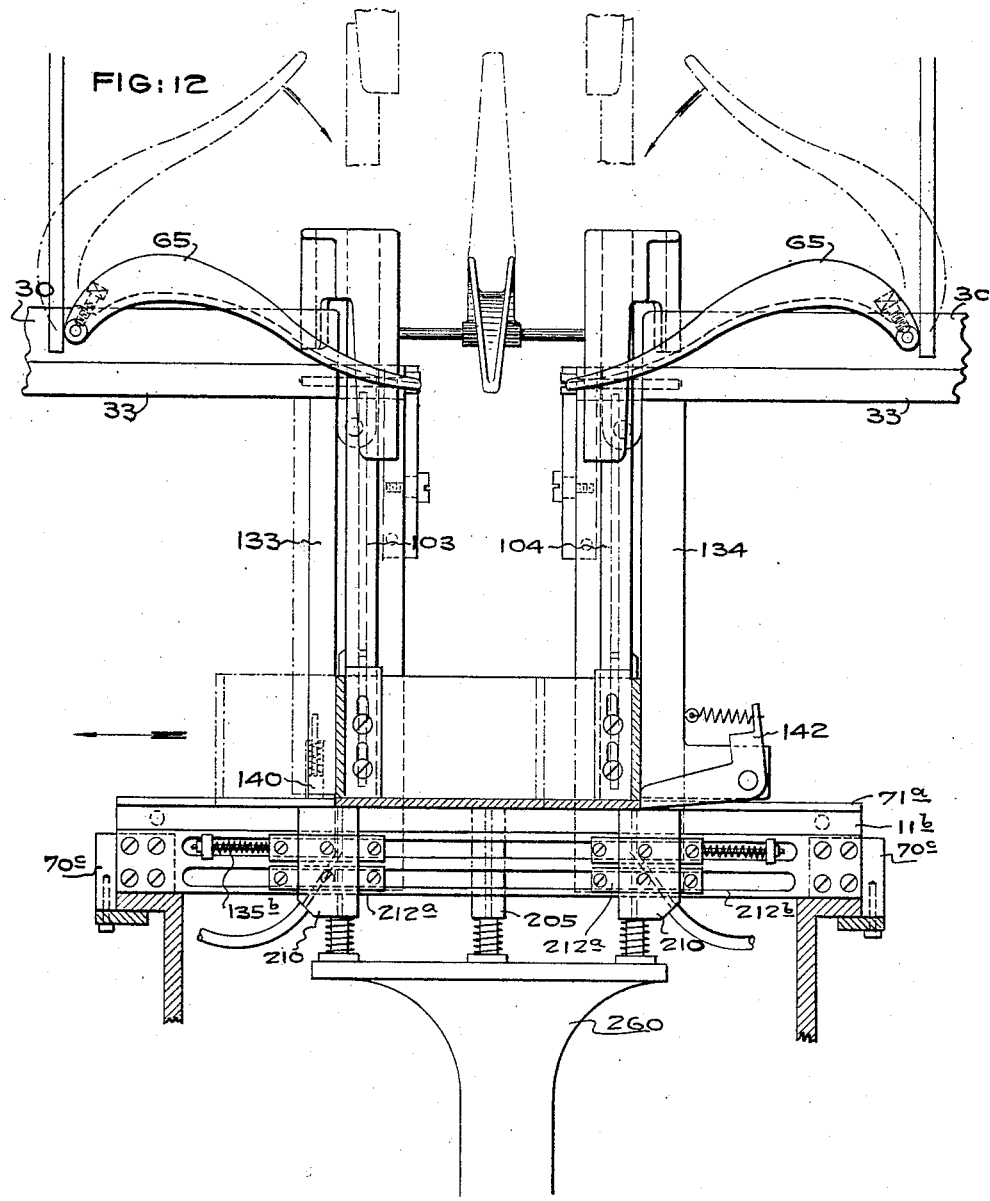

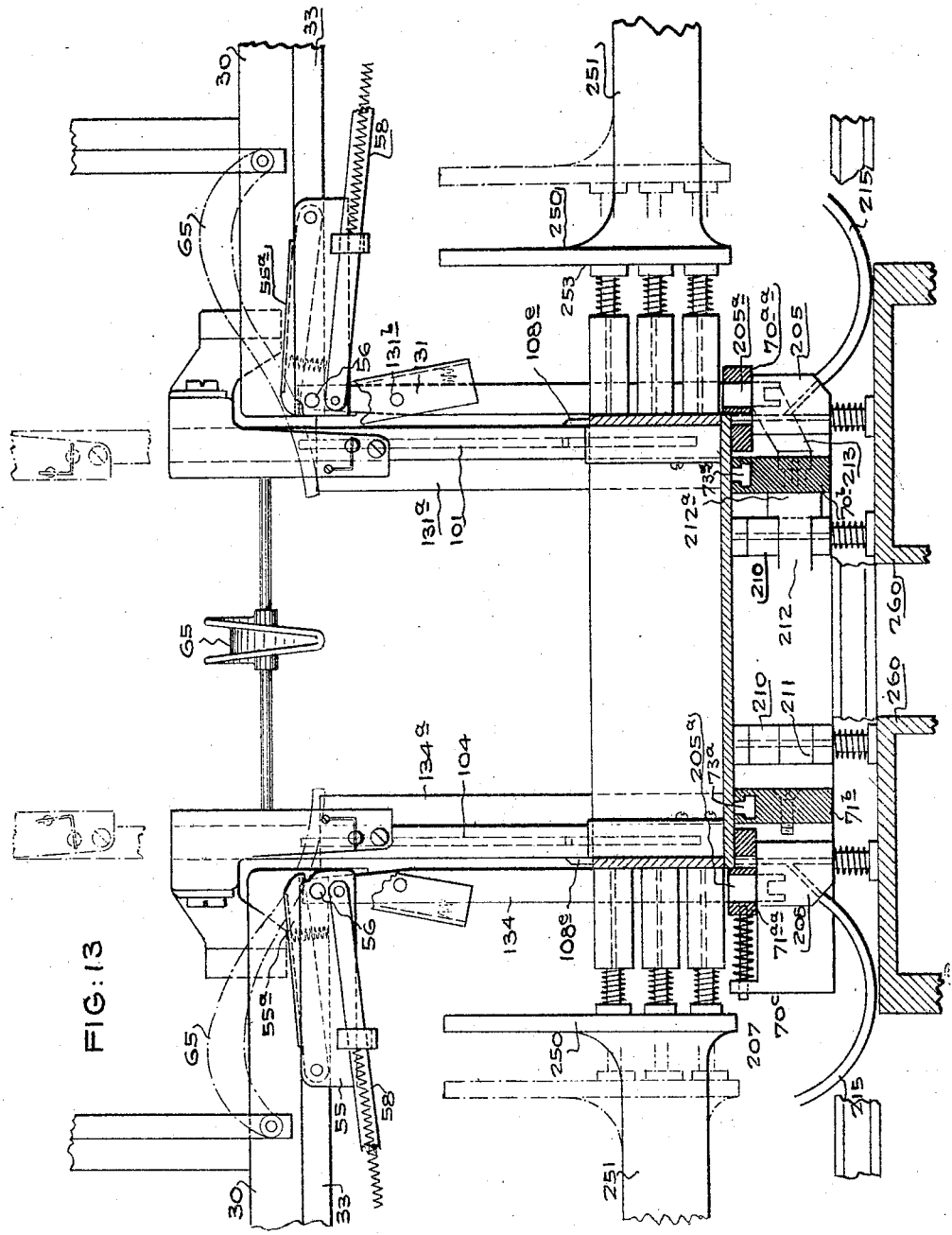

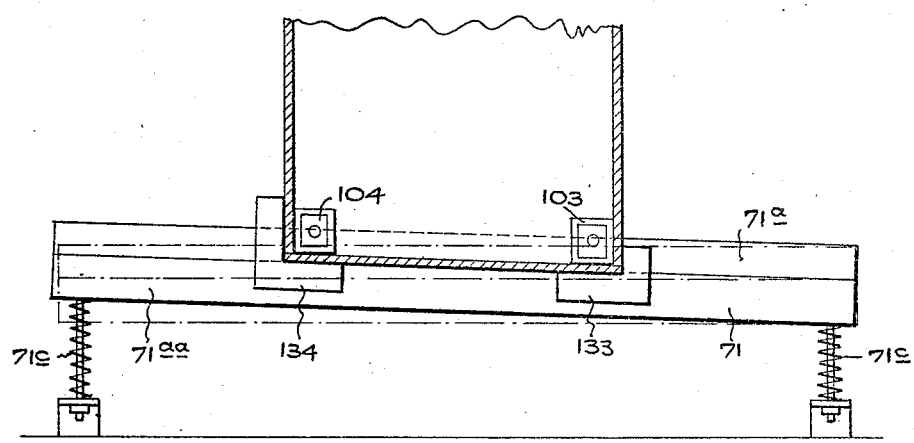
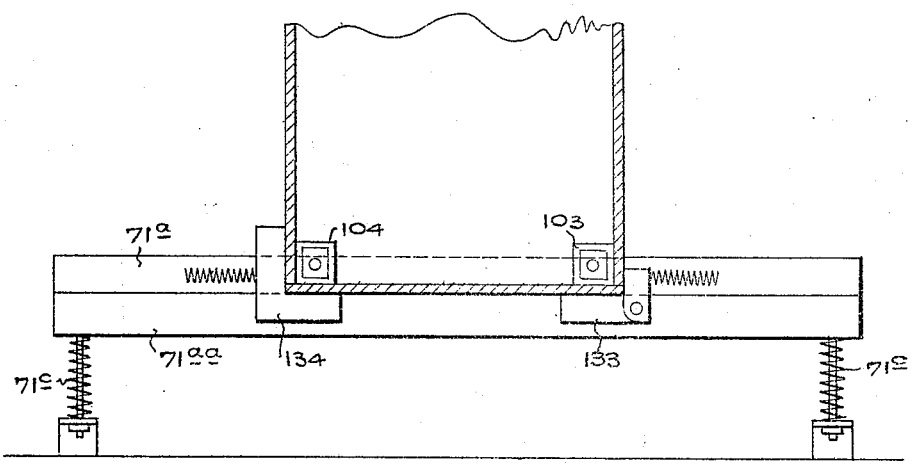

R. C. NEFF.
BOX MAKING MACHINE.
APPLICATION FILED APR. 23, 1914.
1,305,398.
Patented June 3, 1919.
13 SHEETS—SHEET 10.
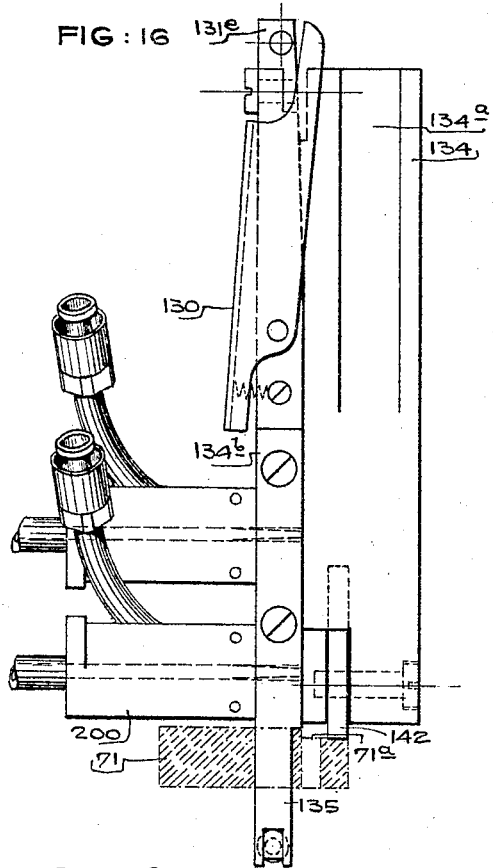
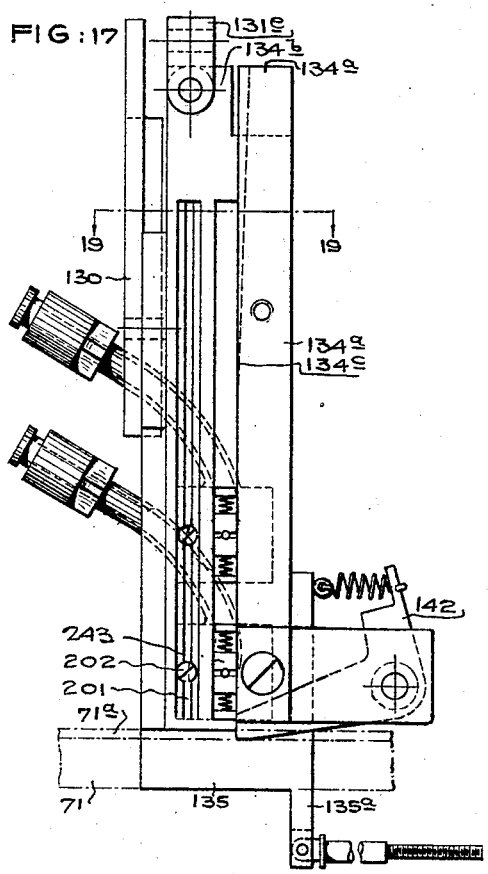
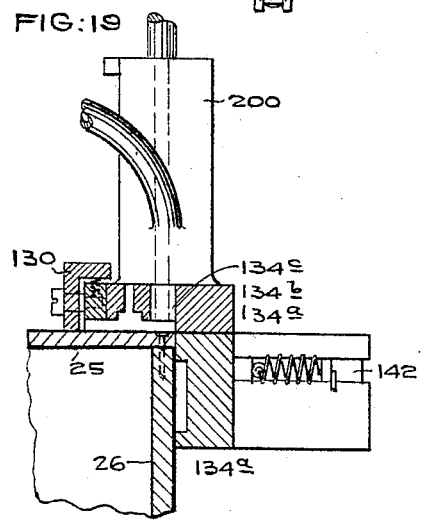
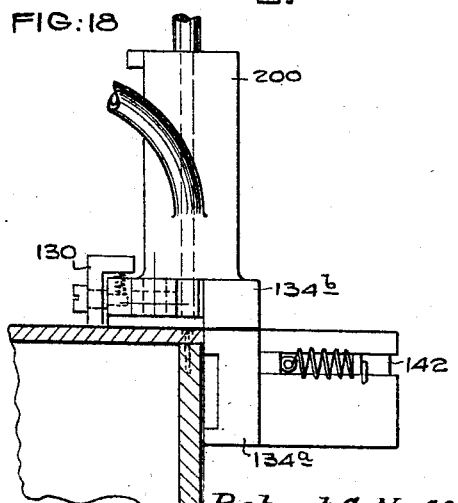
Robert C. Neff
Inventor

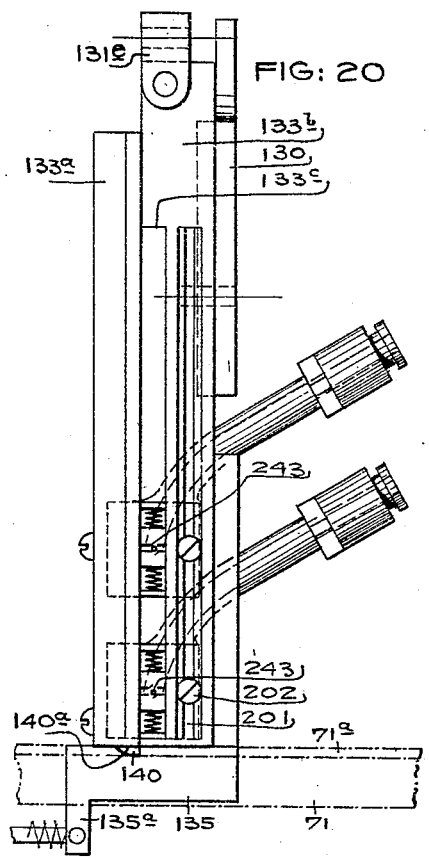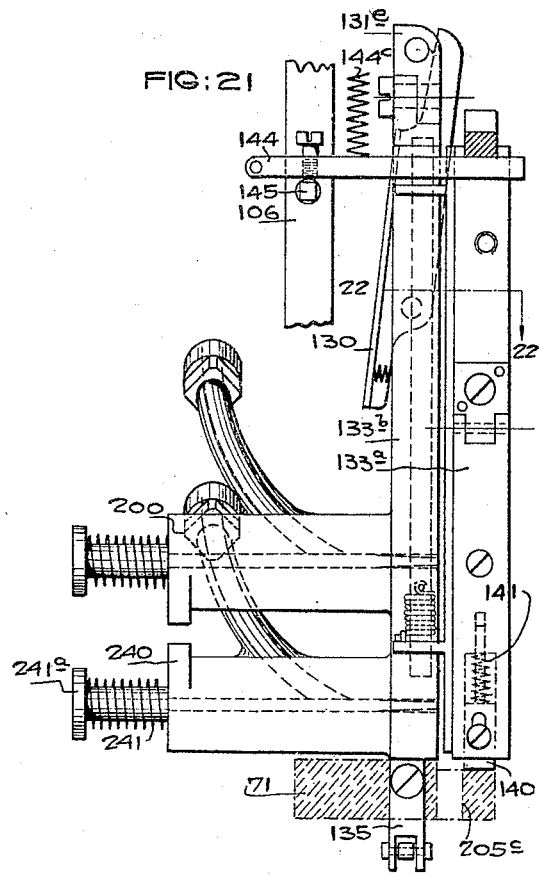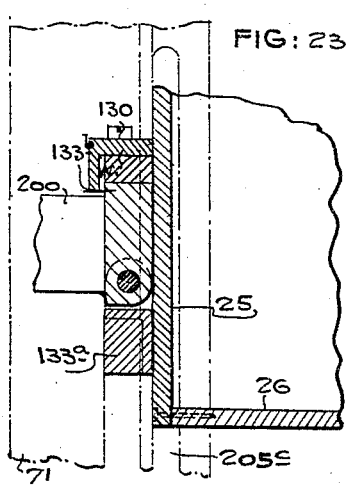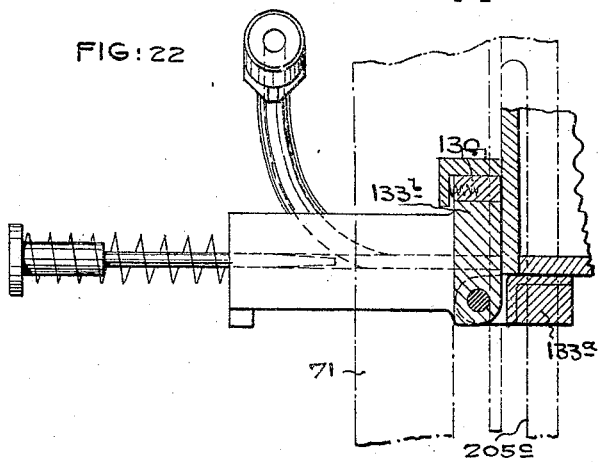

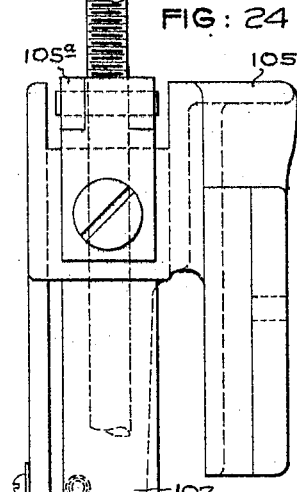
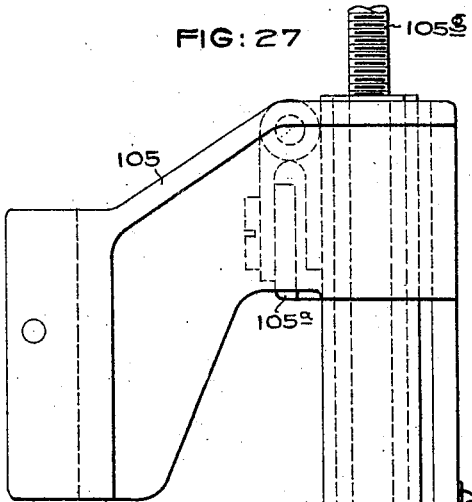
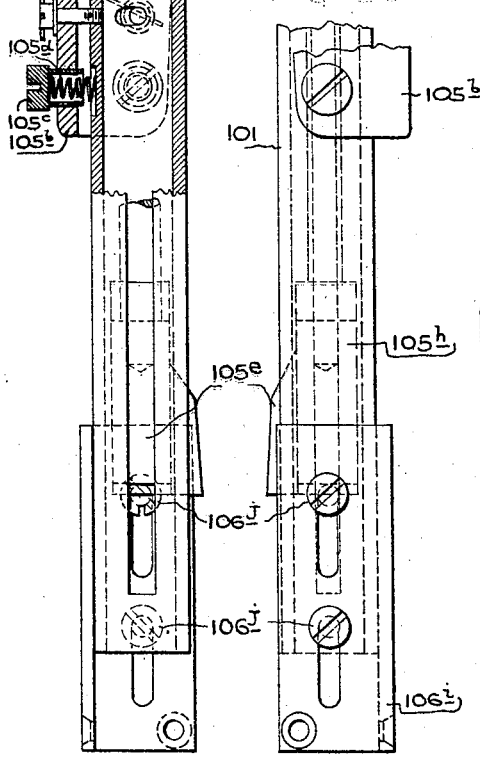
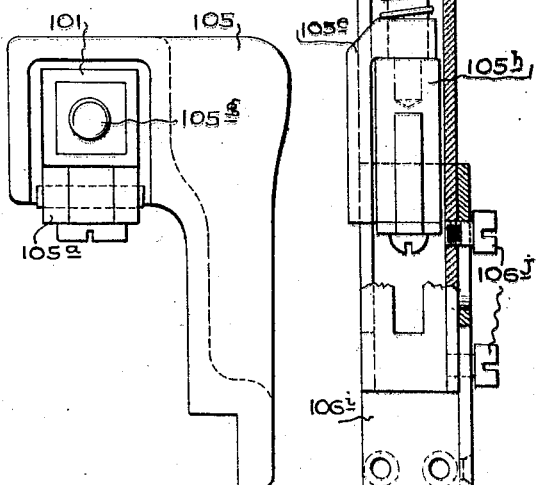

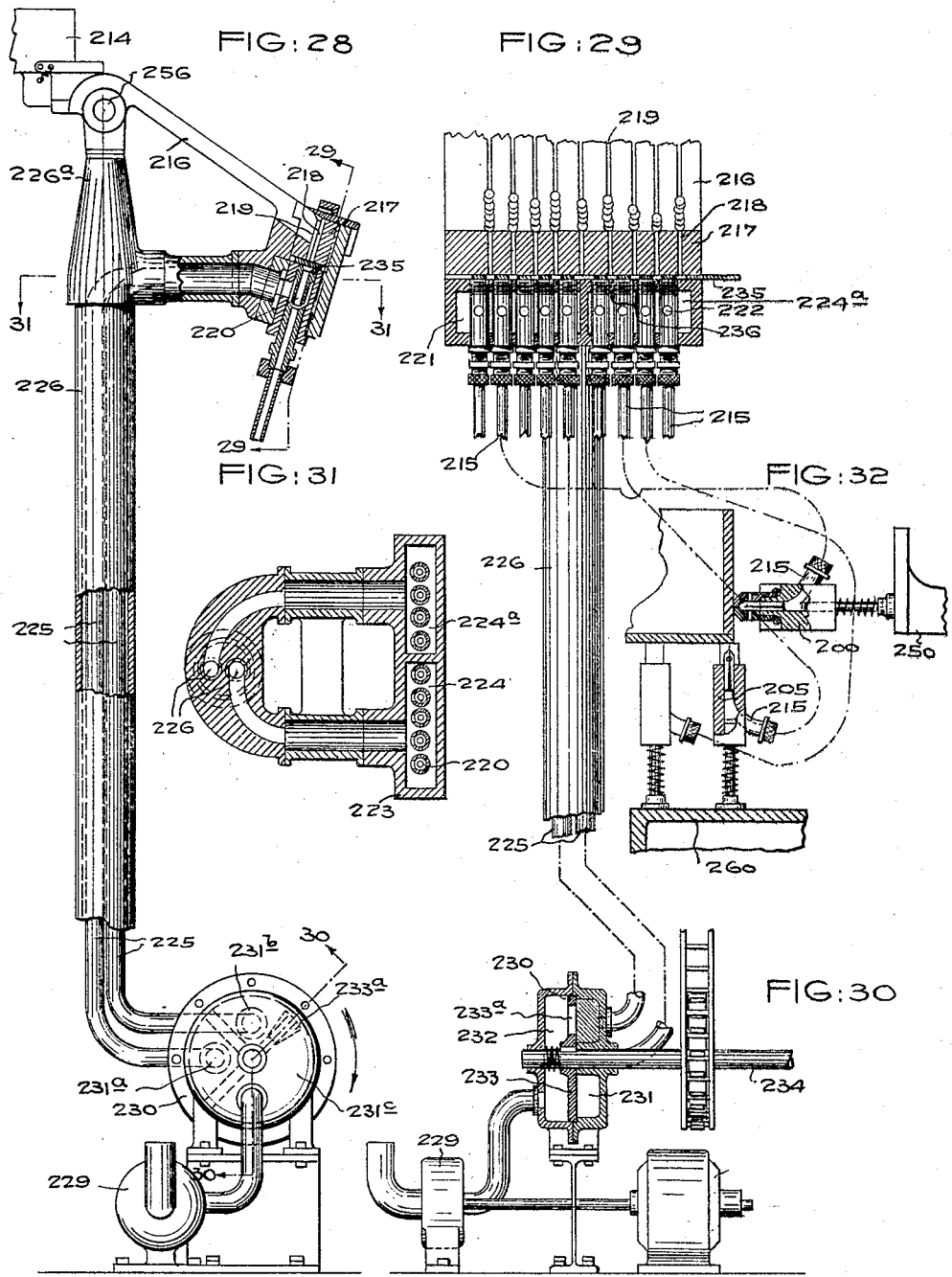

UNITED STATES PATENT OFFICE.

ROBERT CASSELLMAN NEFF, OF BROOKLYN, NEW YORK, ASSIGNOR TO CARL F. BOKER, OF NEW YORK, N. Y.

BOX-MAKING MACHINE.

1,305,398.  Specification of Letters Patent.  Patented June 3, 1919.

Application filed April 23, 1914. Serial No. 833,931.

*To all whom it may concern:*

Be it known that I, ROBERT C. NEFF, a citizen of the United States, residing in the borough of Brooklyn, in the county of Kings and State of New York, have invented certain new and useful Improvements in Box-Making Machines, fully described and represented in the following specification and the accompanying drawings, forming a part thereof.

This invention relates to a machine for making boxes, and has for an object to produce an automatic machine particularly adapted to make wooden boxes, having four sides and a bottom.

A further object of my invention is to produce a forming mechanism to be used in connection with box machines which is adapted in forming the boxes, to bring the edges of the shooks into exact alinement at the respective corners, assembling and nailing the sides and the bottom substantially simultaneously.

A further object of my invention is to provide means for conducting and presenting nails to nail driving mechanisms by means of air blasts, a mechanism whereby the nails are delivered into the nail driving chucks and held both horizontally and vertically by air pressure in proper position for driving until acted upon by the plungers which force them into the wood.

A further object of my invention is to provide convenient means for adjusting the various mechanisms to operate upon boxes of different dimensions.

Various other objects and purposes in the production of my invention will be more particularly described in the specification and drawings herein.

In its general features, the machine of my invention is designed to make boxes of various sizes and it also has adjustable features to accommodate variations in the size of lumber of which boxes are constructed. While there is no limit to the dimensions of the box that may be produced by my machine, it will be found especially adaptable to the ordinary size of commercial box and to the making of the relatively smaller boxes, such as cigar boxes, for example.

Generally described the frame work of my machine is composed of two parts, a base or main portion, comprising the usual four-leg type of standard frame, and a superimposed sectional or adjustable frame portion, comprising four principal brackets, which are adjustably arranged in rectangular form, (as shown in general plan view in Fig. 2,) upon which brackets are similarly supported corresponding portions of the several operable mechanisms of my preferred embodiment.

These main brackets do not rest immediately upon the base frame but upon two transversely disposed guiding bed plates which in turn are mounted upon the horizontal guide rails that form the top of said base frame. Therefore, to maintain their rectangular arrangement two of said principal brackets have been slidably mounted upon each of the bed plates and means have been provided whereby corresponding brackets on different guide plates may be similarly moved relatively to the others; and by providing further means for adjustably moving one of said guiding bed plates, maintaining its parallel relation to the other, it has thus been made possible to adjust these brackets both longitudinally and laterally, without modifying their rectangular arrangement upon the base frame.

In the preferred construction, these ends are attained by having one of the transverse bracket supporting bed plates permanently secured at its two ends, to the top guide rails, of the base board upon which it rests, and by having one of the brackets resting thereon, in like manner secured against slidable movement thereon. The other bracket is slidable longitudinally of its bed plates relatively to and from the fixed bracket thereon, and in like manner the corresponding bracket of the slidable guideway is fixed thereto, while its mate slides thereupon.

Thus one bracket at one corner of the machine is stationary for all sizes of boxes, while the other brackets may be moved on parallel ways so that by any suitable means as for example, simultaneously operated twin screws, any two given brackets may be simultaneously made to approach or recede from the oppositely disposed brackets in either direction, that is, laterally or longitudinally of the machine.

To each of these movable or main brackets are secured other brackets and attachments which relate to the several operable mechanisms of my invention, the several mechanisms for assembling the shooks in the process of forming the frame of the box, and placing the bottoms thereon, and for removing of the parts thus formed into the range of the nailing mechanisms which comprise the various nailing chucks, which parts are likewise suitably attached to and supported by corresponding brackets and thus conveniently grouped at the respective corners of the boxes to be formed thereby. Therefore, inasmuch as practically all of the operations necessary to the formation of the rectangular box have natural reference to the edges and the corners where the forming is effected and the nails driven, one of these brackets has accordingly been placed at each of the four corners of the box to be constructed upon the machine, upon which it has been found convenient to attach all of the various mechanisms and devices which pertain to the respective ends and the sides which compose the box.

The various cams and the respective levers and studs actuated thereby, by means of which the shooks are assembled, the boxes formed, and the nails driven therein, are grouped upon the main shaft or upon counter-shafts or other shafts auxiliary to and driven by the main shaft, in such a manner that they may when required, be shifted along with the movable brackets in the process of adjustment to various positions required, specially provided extensions on said brackets having been suitably provided upon said main brackets.

The nails to be used in connection with the present form of my invention are selected by two rocking hoppers which are supported upon posts attached to the rear members of the adjustable brackets so that as the machine is adjusted to make different lengths of boxes, the nail selecting hoppers travel with them, thereby maintaining the connection in their original and proper relationship.

In order conveniently and efficiently to handle the nails, in conducting them into the nailing chucks in proper form to be operated upon thereby, whether to be driven horizontally, vertically or at other desired angle, I have employed a pneumatic nail conveying mechanism by means of which a blast of air introduced at the top of nail conducting tubes not only insures their safe travel through the tubes but the pressure of the air therein sustains the nails in whatever position required until acted upon by the plungers which drive them into the wood.

There are various nailing machines in use and various methods have been employed in supplying such machines with nails in proper form and arrangement for use therein. While in the present form of my invention I do not deem it necessary to designate any particular form of nail hopper or other detail of nail selecting mechanism, yet I desire to point out what I consider the pneumatic feature above referred to, which I have employed in the preferred form of my invention with satisfactory results, as peculiarly applicable to the preferred embodiment of my invention and especially with regard to the nail feeding and driving mechanism, and hence I desire that feature to be incorporated broadly in connection with my invention in its most complete form, and I shall therefore hereinafter more particularly describe the same together with the other features set forth in the following specifications.

Although the different mechanisms constituting my invention are so far inter-related that there is no natural line of demarcation between the various devices constituting the whole, yet, for convenience, they may be arbitrarily classified as (1) a forming mechanism comprising (a) shook assembling mechanism, and (b) forming device proper; (2) a nailing mechanism, including (a) nail selecting, (b) nail conducting and (c) nail driving devices; (3) a pneumatic or air controlled mechanism (strictly part of the nailing mechanism); and (4) an adjusting mechanism (whereby the nail driving and forming mechanisms are adjusted simultaneously with the shook assembling and forming mechanisms).

Figure 10:
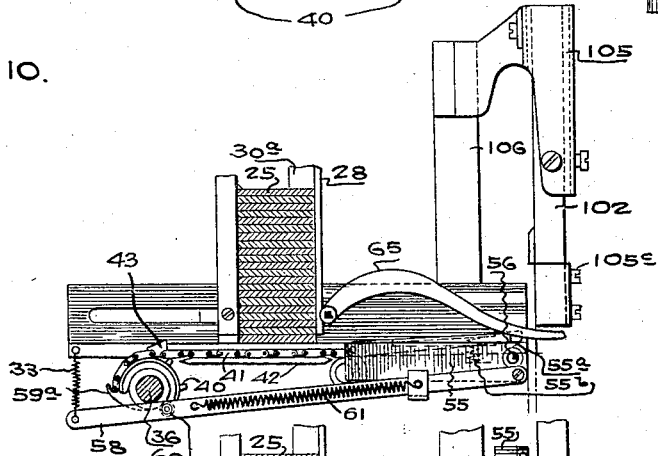
Figure 11:
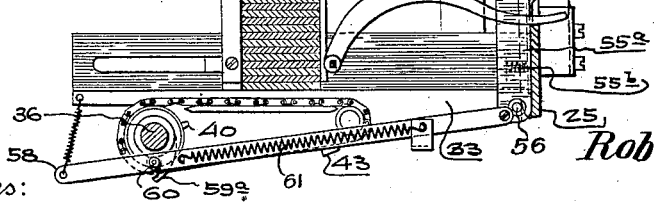

In the accompanying drawings, illustrative of a preferred form of my invention, Figure 1 is a front elevation; Fig. 2 is a side elevation; Figs. 3 and 4 together form a sectional plan on line 3—4 of Fig. 2; Fig. 5 is an enlarged partial plan; Fig. 6 is a vertical section of the machine on line 6—6 of Fig. 1. Fig. 7 is a vertical section on the plane of the central or main shaft; Figs. 8 and 8ᵃ are details of the shook ejecting mechanism; Fig. 9 is a plan view of the side and end shook advancing mechanism; Figs. 10 and 11 are partial views of shook feeding details, the parts in the latter figure shown in a moved position; Figs. 12 and 13 are enlarged transverse sectional end and side views respectively of the forming mechanism; Figs. 14 and 15 are diagrammatic partial plan views showing the operation of the box forming mechanism in connection with irregularly shaped bottom pieces; Figs. 16, 17 and 18 are respective side and front elevations and plan view, of one of the rear forming members; Fig. 19 is a sectional view taken on line 19—19 of Fig. 17; Figs. 20 and 21 are respective front and side elevations of a forming member having a swinging guide wall; Fig. 22 is a sectional plan view taken on line 22—22 of Fig. 21, showing a swinging member in normal box forming position; Fig. 23 is a sectional view similar to Fig. 22 with the swinging member thrown open by a box being ejected; Fig. 24 is a side elevation of an inside forming member with a portion broken away to show details; Fig. 25 shows the opposite face of the lower end of the members illustrated in Fig. 24; Fig. 26 is a plan view of member shown in Fig. 24; Fig. 27 is a side elevation of said forming member, with portion broken away to show other details; Fig. 28 is a side elevation of the nail selecting mechanism showing application of pneumatic means for conducting nails; Figs. 29 and 30 are sectional views, the former on line 29—29 of Fig. 28, the latter on line 30—30 of said figure, which together complete the front elevation, with connections indicated, of the parts shown in Fig. 28; Fig. 31 is a sectional plan view on line 31—31 of Fig. 28; and Fig. 32 shows nail chucks in two positions with nails held by pneumatic pressure therein in position to be driven into the box materials.

Having reference to the drawings, 1 represents a frame of the usual form for machines of this class, having belted to its end pieces 2 and 3, side frames 4 and 5, which support the top guide rails 6 and 7, extending the full width of the machine and having resting thereon the two transverse guiding bed plates 120 and 121. (See Figs. 1, 2, 5 and 7). These plates are supported at their ends in parallel arrangement upon the frame 1, and have upon their upper surface longitudinally thereof, the ways 120ª and 121ª respectively, upon each of which are adapted to slide two of the four upright brackets 21, 22, 23 and 24, the brackets 21 and 22 at the right hand side of the machine being held in alinement upon the ways 120ª, while the brackets 23 and 24 are similarly supported upon the guideways 121ª.

The main actuating shaft 10 is supported upon the cross bars 8 and 9 of the frame in suitable journals 11, thereon, and upon which shaft is the gear wheel 12, at the left hand end of the frame, which is in mesh with the pinion 13 securely pinned to the hub of the driving pulley 15, loosely mounted upon a stud 14, projecting outwardly from the cross bar 9 at the end of the frame 1. (Figs. 1 and 2). The driving pulley 15 may be connected in the usual way with the source of power in connection with which a countershaft is employed preferably with the usual tight and loose pulleys.

Upon the main shaft 10 are arranged various cams for actuating the several mechanisms employed in assembling and nailing shooks to form boxes, which mechanisms, as will be more particularly described, are conveniently arranged upon the brackets 21, 22, 23 and 24; and as also will be shown one of these brackets, the right hand rear bracket, to effect certain adjustments, is stationary, while the others are moved relatively to said stationary bracket of the machine, and in consequence of which the actuating cams on the main shaft, namely, those shown at the right end of the machine in Figs. 1 and 7 which relate only to parts upon the stationary brackets, are simply keyed to the shaft 10, while the corresponding cams at the opposite side of the machine are splined thereto, and thereby adapted to slide longitudinally thereof, whereby they may retain their fixed relative position with reference to the brackets to which they relate. In like manner other actuating parts are slidably attached to their respective shafts in similar manner, and will be so referred to in connection with the several mechanisms to which they relate.

*The forming mechanism.*

In the preferred embodiment of my invention, to form a box I bring together from opposite directions the end pieces 25 and the side pieces 26 to the operable center of the machine forming a rectangular frame, and then attach the bottom shooks 27 to the frame in substantially the normal position of the box resting upon its bottom. These box-forming pieces will hereinafter be referred to as ends 25, sides 26 and bottoms 27 respectively, or by the general term— shooks—by which name they are generally known in the box making trade. The ends 25 and the sides 26 of the box are arranged in vertical columns at convenient points for carrying the same into the centrally located forming mechanism, the individual shooks lying flatwise one over another, the lowermost shook of each column resting upon supporting bars 33, which extend beyond the side walls 28 of the respective channels of the shook-holding mechanism to form guideways for conducting the respective shooks supported thereon, into the forming mechanism.

A rectangular forming mechanism 100 is situated in the central portion of the machine and its vertical arms 101 normally stand in position to receive shooks from the hoppers containing the sides 26 and ends 25, which are supported upon and delivered along the slideways 33 in substantially the same plane above which the arms of the forming mechanism normally project. After thus receiving the shooks to form the rectangular frame of a box upon what may be called the upper level of the machine, the forming arms mechanism is caused to descend vertically to the lower level or the plane on which the bottom pieces 27 are stored and along which the individual pieces are conducted to a point immediately below the descending forming mechanism, in which position the partially formed box is placed upon the bottom 27, and there receives all the nails which are driven in substantially a single operation to form a completed box. Thereupon the arms of the forming mechanism are returned to the upper level to repeat the operations described, the box previously formed being carried at each operation out of the machine while the new bottom is being brought directly underneath the descending forming device.

For convenience therefore in describing the relationship of the portions constituting the present form of my invention, the location of those side and end shook guiding bars may be referred to as constituting the upper or framing assembling level and to like purpose the plane of the guiding floor supplied by the horizontal bars 70 and 71 having the bottom guiding recesses 70ª and 71ª, forms a lower level, upon which the bottoms are supported and guided as they are conducted into the nailing mechanism.

The respective levels of the machine, as they have been termed, are determined by the height of the four brackets 21, 22, 23 and 24 comprising the sectional superstructure above referred to, which in turn is governed by the maximum height of boxes which the machine is adapted to produce, for the reason that the finished box is ejected horizontally along the recess bars 70 and 71, constituting what may be termed a continuation of the floor upon which the bottom originally rested and was fed into the forming mechanism, therefore the level thereof must necessarily be of sufficient depth to allow for the formation and ejection of the box upon said bars 70 and 71.

The brackets 21, 22, 23 and 24 not only thus establish said levels by their height, but also by their relative position one with the other, control the dimensions of the forming mechanism 100, thereby determining the width and the length of box that may be made. The means for modifying the relative positions of said brackets constitutes the main adjusting features of my invention as employed in its present embodiment, and will be more particularly described hereinafter, but the general nature may be advantageously referred to in the present connection to show to what extent it has influenced or controlled the peculiar mechanism and the form of construction of certain of the devices connected with these adjustable supporting brackets.

*The assembling mechanism.*

The shook assembling mechanisms include all parts relating to the storing and conveying to the forming mechanism shooks 25 and 26, which form the rectangular frame of the box. The parts relating to each of the four sides and ends are substantially similar in form, arrangement and operation, and I will therefore describe in detail the parts relating to only one of the shooks except where otherwise specified. For example, side shooks 26 are shown in Fig. 6 in the sectional elevation in the magazine hoppers, one each at the respective sides of the machine while in like manner, end shooks 25 are shown in Fig. 7 in their respective hoppers at the front and back of the machine. Hence, by comparing the parts as illustrated in the enlarged view in Fig. 10 or 11 of the rear hopper containing side shooks 26 with the other hoppers illustrated in Figs. 6 and 7, a clear understanding may be had similarly of the several parts of the mechanism.

Referring to the enlarged view in Fig. 10, shooks 26 are shown held in vertical alinement by what may be termed the skeleton frame hopper 26ª, having at its inner side two oppositely disposed angular channel pieces 28, which constitute the inner and end guide walls of the hopper channel. These upright angular channel pieces 28 are fixed to the vertical guide plates 30 which are attached at either side of their respective hopper to vertical faces of the brackets 30ª supported upon the main brackets 21, 22, 23 and 24 respectively. The guide plates 30 have their inner faces flush with the corresponding inner faces 28ª of the uprights 28, a recess having been made for the purpose at the bottom of each of the sides 28ª, corresponding to the thickness of the shook guiding wall 30, the standard 29 being adjustably attached thereto by shouldered screws 31 to constitute the outer guide wall for the stack of shooks thus held in vertical alinement between the oppositely disposed uprights 28 and 29, at either end of shooks 25 and 26.

The front walls of the angular pieces 28 do not extend all the way down to the shook supporting bars 33 but leave sufficient opening at the bottom for the ejection of a single shook laterally along the top surface of the supporting bar 33, yet not having the opening high enough to permit more than one shook to pass under the bars 38 at the same time in the manner described.

The standards 29 which hold the shooks along their outer edge rest upon the shook supporting bars 33 and are adjustably attached to the vertical shook guiding plates 30 by means of a bolt 31, extending through a transverse tongue 31ª in said rear standard, which tongue fits into the horizontally disposed slots 32 in said guide plates. The bolt 31 is threaded into a clamping block on the opposite side of the guide plate so that by turning the bolt and thereby loosening the screw, the rear standard 29 may be moved laterally to any required position along said groove 32, and then by tightening the screw and drawing the tongue into the slot 32, the standard 29 will be brought into an upright position, as may be determined by the width of the shooks to be contained therein.

The shook supporting bars 33 are attached to the guide plates 30 at the lowermost edges thereof, and the rear standard 29 also attached to said guide plates 30 have their lower ends resting immediately upon the guide bars 33, thereby inclosing the hoppers at their rear bottom portions, thereby preventing the bottom shook from being displaced by the return motion of the ejecting mechanism.

The corner standards are definitely fixed as to their position with relation to the forming mechanism and accordingly locate the hopper at a point sufficiently removed therefrom to allow the full width of the shook to be slid along its flat side to the forming mechanism and then to be turned upon its edge, so that the position of the standard 28 is thereby fixed in accordance with the maximum width of a shook to be contained within the hopper of which it forms a guiding wall.

The shook guiding plates 30, as has been seen, form the supporting structure of the respective hoppers containing the ends and side, and with the shook supporting ledges 33 along their bottoms, are extended toward the forming mechanism for the purpose of guiding the respective ends of the shooks as they are being tilted and advanced to the forming mechanism. There are eight of these guide plates 30 therefore, two of which are employed in connection with each shook magazine, and as has been seen they are supported upon the oppositely disposed vertical faces of brackets 30ª on the main brackets 21, 22, 23 and 24. The plates 30 are so arranged that those relating to the magazines containing side shooks are united at their inner ends with corresponding plates of the end shook magazine, incidentally forming square corners with vertical edges, and thereby locating respectively the four corners of the forming mechanism.

As has been pointed out, there is one of said shook guiding plates on either side of each hopper, containing end and side shooks 25 and 26 respectively, and a supporting guide bar 33 is provided at either end of each hopper, which bars conduct the bottom shook from said hopper into the forming zone, located within an imaginary rectangle at the operable center of the machine, within which is adapted to be reciprocated vertically by means hereinafter described a forming mechanism 100, having four vertical forming arms 101, 102, 103 and 104, which are yieldingly attached at their respective tops to reciprocating slides 106, which arms 101, 102, 103, and 104 when in their normal elevated position as shown in Fig. 10, receive the shooks as they are brought from their respective magazine hoppers to the forming mechanism.

It is thus seen that the brackets 21, 22, 23 and 24 support the respective hoppers for the end and side shooks, or more particularly described, as will be seen by referring to Fig. 9, each of said brackets contains the shook supporting mechanism for the adjacent ends of respective end and side pieces 25 and 26, so that at the four sides of the forming mechanism are located the respective mechanisms employed in supporting and forwarding the sides and ends composing the frame of a box. The shook forwarding means consisting of four sets of guiding members, comprising two parallel guiding bars 33 in each set, arranged in the form of a Maltese cross having at its center the forming arms above referred to, which forming parts it has been shown, are supported upon and operated by vertical slides whose bearings are in the brackets 21, 22, 23 and 24, to which the shook assembling mechanism is thus also attached.

Although the brackets 21, 22, 23 and 24 must be adjusted in accordance with the lengths of material to be worked upon, according to the respective dimensions of the boxes to be made thereby, which adjustment is provided by means which will hereinafter be explained, it is apparent that in whatever position the brackets may be placed in the process of adjustment, the operation and the action of the parts will be the same, and I shall therefore describe the means employed for carrying the shooks from the hoppers into the forming mechanism without reference to the adjusting means, and also point out the means employed and the operation thereof whereby the shooks are assembled upon the forming mechanism substantially in the manner in which they are permanently nailed together in forming the box.

Upon the brackets 21ª, 22ª, 23ª and 24ª extending laterally and upwardly from the main brackets 21, 22, 23 and 24, (Figs. 1, 2 and 9) and terminating in the elbow brackets 21ᵉ, 22ᵉ, 23ᵉ and 24ᵉ, respectively, in suitable journaled bearings thereupon are supported four shook actuating shafts 35, 36, 37 and 38, which may be described as forming a rectangular frame about the machine at the upper level thereof in which are located the shook supporting and assembling mechanisms above referred to. These four shafts are all operably connected to rotate together by means of miter gears 39 at their respective ends, so that when caused to rotate, the top portion of each of said shafts will move with all others that is, the top portion of all of them will move toward or away from the center simultaneously. Upon these shafts therefore, are the actuating mechanisms for advancing the shooks from which the frame of the box is composed as clearly shown in Figs. 6, 9, 10 and 11 as will now be described more in detail.

Upon each of said shafts (see Fig. 9) are two sprocket wheels 40 having upon each a sprocket chain 41, which chains run along the top of the horizontal ledges 42, which project laterally from the brackets 30ª in order to support the respective chains 41 relatively to the top surface of the guideways 33 to which they relate and upon which rest the respective ends of the lowermost member of the column of shooks, so that the top surface of each chain 41, travels upon a plane slightly below that of the upper surface of the adjacent guideways 33. Upon the chains 41 is a dog or pawl 43, which is held by action of a spring, not shown, in a normal elevated position as shown in Fig. 10, where it is seen to project slightly above the top level of the shook supporting and guiding cleat 33, so as to engage the edge of the shook 25 or 26, resting thereon, when the chains 41 shall be carried forward by rotation of the shaft upon which is keyed the sprocket wheel 40, relating thereto.

Of the four shafts referred to shaft 35 is the actuating member, having at the extreme end thereof a pinion 45 in mesh with a rack 46 upon the cam actuating bar 47, whose upper end is provided with a slot which bears upon the extension of shaft 35, which serves as a support for said bar 47, and operably holds the rack 46 in mesh with its pinion 45, which is actuated by the reciprocal motion of said rack.

The cam bar 47 is also slotted at its lower end and spans the main driving shaft 10 in like manner in which it rests upon the shaft 35 above described, thereby furnishing a guide and support for the lower end of said bar which has the cam rolls 49 and 49ª, suitably supported on studs upon the outer face thereof, so that their bearing surfaces may alternately be contacted by the profile cam 51 on said shaft 10. The cam rolls 49 and 49ª are not arranged upon the longitudinal axis of the bar 47, but to one side thereof, so that the high portion of the cam may operate upon the respective rolls in the manner indicated.

Therefore, as the cam 51 rotates the bar is reciprocated and the shaft 35 and those connected therewith are caused to rotate in first one direction and then another in accordance with the respective motions of the bar, by means of which the four shafts simultaneously drive their respective sprocket chains alternately back and forth with the result that as the shaft 14 moves forwardly in the direction of the arrow, (Fig. 2) each of the sprocket chains will carry their shook engaging pawls 43 in the direction of the forming mechanism 100, and thereupon, by the continuation of the revolution of the cam 51 through the succeeding 180° of its rotation, the lower cam roll 49ª will be contacted thereby and accordingly all of the shafts 35, 36, 37 and 38 will be rotated in the opposite direction and the respective pawls 43 will be returned to their normal resting position, one of said pawls being clearly shown in such normal resting position, in Fig. 10.

The pawl 43 has been shown to be provided with a spring yielding means, which, it is apparent, will only be required where, as in the illustrated form of my invention, the reciprocal motion is imparted to the actuating mechanism, making it necessary for the pawl to be thrown down out of range of the bottom shook as it returns; but even in case the chain be driven reciprocally the pawl need not yield, means being thereby supplied whereby the shooks are agitated to insure their feeding down properly. It is obvious, however, that the sprockets 40 may be driven continuously by suitable connection with the main shaft 10, by use of sprocket connections, for example, wherein the relative size of the sprocket wheels have been properly proportioned, in which case the pawl 43 would not require the yielding feature, there being no return thereby causing the same to pass under the shooks as contained in the hopper in connection with which the pawl 43 is employed.

As has been pointed out, the channel walls 28 are permanently supported upon the guiding plates 30, and that to allow for different widths of shooks, varying according to the height of the box to be formed thereby, such difference in width may be compensated for by moving bars 29 as required; therefore in order to enable the pawl 43 to engage shooks of different widths, the normal position of rest of said pawl 43 is established at a point back of that to which the widest shook would extend, as illustrated in Fig. 10, in which are shown shooks intended for a box below the maximum dimensions which this mechanism is adapted to handle. Hence, as the pawl 43 is carried forward it may travel a portion of its allotted movement before it contacts with the shooks which it has been seen, are lying horizontally upon the bars 33 upon what has been termed the upper assembling level. Thus lying on their sides the shooks are advanced to the forming mechanism and in order to form the shooks into the frame of a box, it is necessary that they be tilted from their horizontal to vertical position, and in the present embodiment of my invention, as these shooks are thus turned on edge they are at the same time placed upon the vertical arms of the forming mechanism 100 in a manner next to be described.

At the four sides of the assembling center (see Figs. 6, 7, 10, 11, and 13) a tilting arm 55 is loosely pivoted upon a stud 56 at the inner end of each of the guiding bars 33 upon which the shooks 25 and 26 are conducted to the forming arms 100. There are two of these tilting arms 55 for each of the shooks, one at either end thereof, alongside of the bars 33 so that their top surfaces are flush with the corresponding top portion of the shook supporting bars 33, the tilting arms having their outer ends slightly beveled so as not to interfere with the passage of the shooks as they slide upon the bars upon issuing from the hoppers. Therefore, as they rest in their normal position alongside of the guiding bars 33, with their free or swinging ends located at a point slightly back of that to which the pawl 43 delivers its shooks upon its forward or ejecting stroke, these vibrating arms are in position to receive a shook thus delivered, and as they are simultaneously rocked from a horizontal to a vertical position, the arms will operate to carry with them from a flat to an upright position the shook which has been previously carried thereupon.

The means employed to vibrate the arms 55 in the manner indicated comprise an actuating bar 58 attached at one end by means of a shouldered screw on each of the arms 55, said screw being located immediately below the pivot stud 56, and slightly beyond the vertical line passing through the center of said stud. Near the opposite end of each of the bars 58 is a stud roll 60, which is adapted to be engaged by the hook projection 59ª upon the hub of each of the two sprockets 40 upon their respective actuating shafts 35, 36, 37 and 38, one of which sprockets is keyed, and the other splined to its shaft for purposes of adjustment. A spiral spring 61, secured to the outer end of a guide plate 30 is attached to the outer end of an actuating bar 58, and holds it upwardly against the shaft, so as to bring the stud 60 on said bar into engaging relation with its respective hook projection 59ª on said shafts 35, 36, 37, and 38 to cause the said bar 58 to be moved in the direction of its length by the revolution of said hook projection and against the action of the spiral spring 62, attached to the actuating bar 58 and to a bracket upon the frame 1. (See Figs. 10 and 11). When the hooked projection 59 is carried in the opposite direction by the reversed rotation of its shaft, the rod 58 is likewise carried by action of the spring 62, to return the tilting bars 55 to their normal horizontal position in order to receive the next succeeding shook.

The shooks are delivered with their outer edges resting at or near the outer end of the vibrating arms 55 and the actions of the tilting arms are so timed that they vibrate upon their pivots after the shook-ejecting pawls on the sprocket chains have traveled to the end of their forward stroke, and in the present form of my invention, the tilting occurs immediately after the delivery of the shook upon the tilting arms. This arrangement is conveniently attained by placing the projecting hooks 59 on that portion of the periphery of the hub of the sprockets 40 which brings the projecting hook into contact with the studs 60, as the sprockets 40 carry the pawls 43 to the vibrating arms 55, thereby delivering the shook to said vibrating arms before the latter oscillate upon their pivots.

In forming the frame of a box two opposite sides are nailed to the ends of the two other pieces, and in my machine the shooks 26 have the shooks 25 nailed upon their respective ends. To cause the shooks 25 to be thus placed upon the ends of the shooks 26 as shown in Fig. 11 the tilting arms 55 tip the shooks 26 first into place against the forming arms 101, 104 and 102 and 103, respectively, and then immediately after tip the shooks 25 toward the opposite faces of the forming arms 101, 102, and 103, 104. This is accomplished by advancing the relative position of the hook projections 59 which are related to the tilting mechanism of the shooks 26, so that the similar projections 59 pertaining to the shooks 25, coming into engagement with the tilting parts immediately afterward, those shooks are brought against the ends of the shooks 26 as they are carried against corresponding faces of the said arms of the forming mechanism.

Where the shooks are narrower than the maximum width capacity of the shook ejecting mechanism, it will be necessary to employ means for carrying the shook to the bottom of the vibrating arms as the latter rises to its upright position, and therefore I provide what may be termed a presser finger 65, to co-act with each side and end tilting mechanism which contacts with the rising front edge of the shook while being edged thereby. Hence as the shook leaves its horizontal position, it is thus forced downwardly along the constantly increasing declivity of the tilting bars so that as they reach their vertical position, the shooks are carried to the lower ends of the tilting bars 55, as shown in Fig. 11.

Having thus been placed in rectangular arrangement upon the forming arms 101, 102, 103 and 104, the shooks 25 and 26 are held in position by the continuing pressure of the vibrating arms 55 against the arms of the forming mechanism 100, until carried to the lower and forming level of the machine. The arms 55 are held in the position of pressing the shooks against the arms 100 by means of a suitable dwell or peripheral prolongation of the high portion of the profile cam 51, which, through the actuating bar 47, causes the ejecting shafts 35, 36, 37, and 38 to rotate, which in turn, as pointed out, cause the bars 55 to vibrate.

The mechanisms relating to storing and assembling the shooks constituting the frame, as has been seen, operate upon a given plane, arbitrarily designated as the upper level of the machine, where the shooks are finally assembled and temporarily held upon the arms arranged in rectangular form on a reciprocating forming mechanism 100 which thereupon carries the frame downwardly to the lower level, where the final operations are performed in making the box.

The bottoms 27 are stored in hoppers upon the so-called lower level and the lowermost bottom shook rests within its hopper $27^a$ upon the plane of the so-called lower level, and is advanced from the hopper to a position directly underneath the descending forming mechanism 100 as it is carrying down the assembled frame to be accurately registered thereupon. But before describing in further detail the construction and mode of operations of the forming mechanism, the facts relating to the storing and moving of the bottoms will be explained.

In its general features the hopper containing the bottoms 27 is substantially similar to those described relative to the sides and ends 25 and 26, having a similar standard 28 with a forward face $28^a$ reaching almost to the supporting surface upon which the lowermost shook rests, leaving a sufficient opening to permit the bottom shook to pass thereunder, but not more than that one. The back standard 29 is also similarly provided with screws 31 through the transverse tongue $31^a$, that fits into a horizontal slot 32, in a side plate 30, whose inner surface corresponds with the inner surface of the side flanges $28^a$, of the forward shook holding standard. This guiding bar 30, however, in connection with the bottoms, performs no similar function to that of the guide bars 30 in connection with the hoppers for the side and end shooks, which guard those shooks against endwise displacement while being tilted upright.

The bottoms 27, like the side and end shooks, are supported at their ends only, resting within their hopper upon parallel bars 70 and 71 at the respective sides thereof which bars extend therefrom to the operable center of the machine and furnish guides upon which the lowermost bottom piece may be slid laterally from its hopper to the forming mechanism. The bars 70 and 71 are horizontally disposed upon supporting bars $70^b$ and $71^b$ (Fig. 5) resting primarily upon the top rails 6 and 7 of the frame 1 but operably connected with the transverse guiding bed plates 120 and 121 respectively, by means of brackets $70^c$ thereon, so that as the bracket supporting and guiding bar 121 is slid laterally along the guiding rails 6 and 7, the bar 71 is similarly moved thereon in adjustment according to the length of the bottom shook 27, one end of which as seen is supported upon the bar 70 and the other end upon the bar 71.

The hopper for the bottoms is conveniently placed at the extreme rear position of the machine so that the height thereof may not be limited by other parts of the mechanism. Therefore the bars $70^b$ and $71^b$ extend entirely across the machine beyond the rear line to furnish a support for the bottom hopper 27, the horizontal bars 70 and 71 being carried back to this point to furnish support for the shooks 27 which rest within the recessed grooves $70^a$ and $71^a$, which supply a continuous guiding means for conducting the bottoms from the hoppers into the forming means and thence out of the machine, after having been nailed to the frame portion of the box.

As the lowermost shook 27 is held with its respective ends resting within the corresponding recesses $70^a$ and $71^a$, upon the bars 70 and 71 (see Fig. 6) it is in position to be engaged at its respective ends by similar pawls 72 upon sprocket chains 73, which are carried by sprockets 74 at one end and curved flanges 75 at their outer ends. The sprockets 74 are upon the shaft $74^a$ having bearings at the respective outer ends of the supporting crossbars $70^b$ and $71^b$, one of the sprockets 74 being keyed to said shaft, the other sprocket 74 being splined thereon, so as to be adjustable according to the length of the bottom 27. The shaft $74^a$ is provided against longitudinal movement within its bearing in said stationary bar $70^b$, but is slidably supported upon the bar $71^b$ and by means of the guide bracket $74^b$ the splined sprocket 74 is held in operable relation to the side thereof as the bar is moved in adjustment along the guide rails 6 and 7.

In like manner the square shaft $80^a$, which carries the sprockets 80, is held in its bearings against longitudinal movement with reference to the said stationary bar $70^b$, but is slidably mounted by means of a collar in the adjustable bar $71^b$. The sprocket 75 which is mounted thereon adjacent to the bar $70^b$ is pinned to said shaft, while the corresponding sprocket 80, on the other hand, is loosely mounted upon said shaft and held laterally by a guide bracket $80^c$ against the adjustable bars $71^b$ in operable contact therewith, so that as the bar $71^b$ is adjusted to various positions, it carries with it the sprockets 75 and 80 adjacent thereto.

The top spans of the similar chains 73 run upon ledges $73^a$ suitably supported upon the surfaces of the respective supporting bars $70^b$ and $71^b$ for the purpose of holding the pawls 72 always in engaging relationship with the shooks 27, as they are carried along the bars 70 and 71 to the point over the sprocket wheels 80.

The shaft 74ª is rotated continuously in the direction indicated by the arrow in Fig. 6 by means of its connections with the main shaft 10, comprising a gear 74ᵈ (Fig. 3) keyed upon said shaft 74ª in mesh with the similar gear 74ᵉ in the hub of a sprocket wheel 76ᵇ loosely mounted upon a stud 75ᵉ projecting from the outer side of the supporting bar 70ᵇ, which sprocket wheel 76ᵇ in turn is driven by a chain 74ᶜ upon the sprocket 76, keyed to a countershaft 76ª, by means of a sprocket chain 77 (Fig. 22), upon the sprocket wheel 77ª on said main shaft 10. Thus, as the main shaft rotates, by means of the various sprocket connections above described, the chain 73 carries the pawls 72 from their normal vertical starting position, which is back of the maximum width of bottom, to a point in the raceway formed upon the prolongation of the bars 70 and 71, immediately over the sprocket wheels 80, where the pawls 72 disappear below the surface, to return to position to select another bottom piece.

At the point where the two pawls 72 deliver the shooks 27, other pivotally yielding pawls 81 (Fig. 6), which are carried by a reciprocating chain 82 pick up the bottom shook and carry the same forward to a position directly under the forming mechanism 100. The chains 82 are attached at their rear ends to sprocket wheels 80 mounted upon the square shaft 80ª, the forward ends of which continue over idler sprockets 83, one of which chains extends downwardly to connect with the end of the bent lever arm 84, which is pivotally supported by a bracket 85 on a bolt 85ª suitably provided therein. The chains 82 run upon laterally projected horizontal supporting grooves 82ª along the respective upper faces of the bars 70ᵇ and 71ᵇ serving to support in engaging relationship the shook advancing pawls 81 and the box ejecting pawls 81ª thereon. The chains 82 are carried forward by the bent lever 84 on the side of which is a cam roll 86, which by action of the spiral springs 87 is held against the periphery of the profile egg-shaped cam 90 rotatably keyed to the main shaft 10. A torsion spring 80ᵇ (see Fig. 4) having one end attached to the square shaft 80ª to which sprocket wheels 80 are fixed and its opposite end to the adjacent supporting bracket 80ᶜ is suitably adjusted to return the chains 82 to their normal position as shown in Figs. 4, 5 and 6.

The recesses 70ª and 71ª which guide the respective ends of the bottoms 27 as they are carried from their hopper toward the operable center of the forming part of the machine are made to constitute continuous parallel guiding channels for said shooks from their position under the hopper where they support the vertical column of bottom shooks 27 at the extreme rearward side of the machine, to the front. Hence, the portion of the bars 70 and 71, which constitute a part of the forming mechanism must be given certain flexibility, that is, one of said bars must be yieldingly held relatively to the other to accommodate the slight irregularities and variations in the shape of the bottom and side pieces which are to constitute the box. Consequently the guiding bar 70 is attached to the stationary guide bar 120 and being a fixed member, the horizontal member 70 may be constructed as a single unbroken shook guiding bar, from the point where it supplies the base of the hopper in which the bottoms are contained, to and through the forming mechanism. The horizontal companion bar 71, however, is operably disconnected from the bottom supporting extension thereof where it is slidably attached to the top edge of the supporting bar 71ᵇ and is given lateral motion at the forming mechanism of which it is an important component.

The laterally movable section therefore, of the horizontal bar 71, which may for convenience be termed the movable member 71ᵃᵃ (see Figs. 14 and 15) of the skeleton bottom of the forming mechanism, and which is yieldingly held upon the supporting brackets 70ᶜ (Figs. 12 and 13) being normally held in its innermost position at either end by means of similarly provided compression springs 71ᶜ attached thereto at one end, and to the supporting brackets 70ᶜ at the other end of each of said springs. Hence, as a bottom piece 27 is carried forward within the grooves 70ª and 71ª of the parallel bars 70 and 71, when it approaches the forming center member 71ᵃᵃ of the movable skeleton bottom of the forming mechanism may be forced slightly outwardly against the action of the compression springs 71ᶜ as the bottom enters, so that the movable skeleton bottom 71ᵃᵃ will not only line up the opposite end of the bottom 27 with the groove 70ª in the bar 70, but by action of the springs at either end thereof will itself conform to the adjacent end of the bottom 27, with the result that the skeleton bottom composed as has been seen of the movable member 71ᵃᵃ and the stationary member 70ᵃᵃ, takes the exact form of the bottom piece 27 that has been introduced therein, thereby controlling the forming mechanism to bring the other parts into the required proper relationship to construct the frame of the box in exact registration thereupon, notwithstanding any irregularities of said bottom piece.

*The forming mechanism.*

The so-called forming mechanism upon which the frame of the box is assembled and carried to the bottom piece 27, as has been explained, comprises four parallel arms 101, 102, 103 and 104, (see Figs. 1, 4, 6, 7, 9, 24, 25, 26 and 27) arranged vertically within an imaginary rectangle considered in cross-section, their outer rectangular faces coinciding with the four corners of said rectangle. These forming arms are secured by their upper ends to the goose-neck brackets 105 by means of double hinges 105$^a$ (Fig. 24) which give to the vertical arms a swinging action in two directions, at right angles one to the other. The arm-supporting brackets 105 are rigidly attached to the vertical slides 106 guided in the upper and lower slide bearings 107 and 108 respectively, the upper bearings 107 of each of the slides being formed in the top portion of one of the main brackets 21, 22, 23, and 24, and the lower bearings 108 being suitably provided within extensions upon corresponding brackets, 21, 22, 23, and 24. The forming arms 101, 102, 103 and 104 are thus provided with means for being raised and lowered as the vertical slides 106 are independently but simultaneously reciprocated within their bearings, which reciprocal motion is attained by means of link connection with lever arms 111, 112, 113 and 114 upon rock shafts 115 and 116 (Fig. 7), which in turn receive their rocking motion through cam lever arms 111$^a$ and 114$^a$ on said shafts respectively, which arms extend downwardly into operable contact with the cams 122 and 123 respectively upon the main driving shaft 10. The rock shaft 115 is supported at the right hand end of the machine by downwardly inclined brackets 118 (Fig. 4) on the transverse guideways 120 and the shaft 116 is similarly supported by oppositely disposed brackets 118 at the left hand end of the machine, being attached to the under portion of the transverse guideways 121, upon which guideways as has been seen, are supported the movable brackets 21 and 22 upon the former, and 23 and 24 upon the latter of said guide bars. The rock shaft 115 carries the two lever arms 111 and 112, above referred to, while the rock shaft 116 at the opposite end of the machine carries similar levers 113 and 114, to the ends of which corresponding lever arms are operably attached, by suitable pivotal connection, the lower ends of the links 109, which by means of the studs 109$^a$, are attached about midway of the length of the vertical slides 106.

Two of said lever arms 111 and 114, are secured by keys to their respective rock shafts 116 and 117, while their companion levers 112 and 113 respectively are slidably attached to these rock shafts by splines 112$^a$ for purposes of sliding adjustment. The vertical slides 106 being operated by the levers 111 and 114 being attached to brackets 21 and 24 respectively, which do not move relatively to the longitudinal axis of the shafts 116 and 117, do not require adjustment of those levers. The brackets 22 and 23, however, may be adjusted to different longitudinal positions relative to said shafts and therefore, inasmuch as it is necessary that the cam lever arms 112 and 113 retain their fixed relationship with the vertical slides 106, which they operate and which are slidably attached to said movable brackets 21, and 23, it is provided that the lever arms 112 and 113 are moved with their respective brackets 22 and 23, and accordingly, the hang brackets or guide arms 112$^b$ and 113$^b$ (see Figs. 2 and 4) are suitably attached to the under side of said brackets 22 and 23 respectively, which have the semi-circular forked ends that are adapted to fit into the angular grooves 112$^c$ and 113$^c$ respectively. Hence, as these brackets are moved in the process of adjustment from one position to another, carrying with them their vertical slide 106, they also thus cause their actuating levers 112 and 113 to accompany them. Inasmuch as the levers 111 and 114 are keyed upon their respective shafts the cam actuated arms 111$^a$ and 114$^a$ which have already been mentioned as relative to parts on the fixed bracket 21, 24, are conveniently attached to the hub of said levers 111 and 114, and thereby held in fixed operable position relative to their actuating cams 122 and 123 upon the main shaft. The cam 122 at the right side of the machine is keyed to the shaft 10 for the reason that the parts to which it relates are operably attached to the stationary bed plates 120, but the cam 123 at the left side is keyed to a sleeve 124 which is splined to the main shaft, and is moved longitudinally of the shaft 10 by means of a hanging bracket 125 secured to the underside of the sliding bed plate 121, said hanging bracket having two bearings one of which is upon the shaft 10 at the end of the sleeve 123, and the other similarly supported upon the sleeve against a collar 125$^a$ thereon. Thus as the bed plate 121 is slid upon the frame in the process of adjustment it carries with it the sleeve 124, upon which are the cam 123 and the cam 259 whose function will be explained in another connection, which actuate the parts operably attached to the brackets 23 and 24 upon said bed plate 121.

The cam rolls 111$^b$ and 114$^b$ at the outer ends of said cam lever arms 111$^a$ and 114$^a$ fit into the respective grooves 122$^a$ and 123$^a$ of the cams 122, 123 and are held in contact with the sides thereof by means of spiral springs 111$^d$ attached to the outer ends of lever arms 111$^c$ having their opposite ends attached to another lever arm 257 presently to be explained acting upon the two levers for convenience of economical construction, thereby holding the levers 111$^c$ in such position as to bring the cam lever arms 111$^a$ and 114$^a$ with which they are connected against their corresponding cam surfaces. The grooves of the channel cams 122 and 123 are substantially of the width of the cam rolls which run therein except at that point where the rolls rest while the slides 106 are in their lowermost position, as shown in Fig. 7, at which point the slide is held in position, not by action of the cam directly, but by that of the spring 111$^d$ at the outer end of the lever arm 111$^c$, so that in case there is a variation in the thickness of material or other irregularity, the yielding connection of this driving part will obviate possible damage to the parts of the mechanism, and material operated upon.

The goose-neck brackets 105 attached at the upper end of the vertical slides 106 from each of which, as has been pointed out, a rectangular forming arm 101, 102, 103 and 104 is connected by a double pointed hinge 105$^a$ have the downwardly extending angular portion 105$^b$ (Figs. 24–27) opposite the respective inner surfaces of each of said rectangular forming arms. Extending through each side of this angular extension are the hollow screw stops 105$^c$, against which the arms 101, 102, 103 and 104, are adapted to be brought into contact, acting as stops to limit the hinged motion of said arms in the direction of either of said stops. Within the screw stops 105$^c$ are compression springs 105$^d$ which are adapted to hold the respective arms 101, 102, 103 and 104, to which they are related, slightly out of contact therewith so that each of said arms will be forced outwardly in two directions by action of the respective spring 105$^d$. The extent of the inward yielding motion, against the action of said spring may be adjustably controlled by turning the screws constituting the stops 105$^c$ to whatever extent desired to correspond with the thickness of material worked upon.

The shooks 25 and 26, comprising the ends and sides respectively of the frame of the box are held against the action of these springs by means of the tilting arms 55, which as has already been explained hold the shooks against said arms as they begin to make their descent to the lower level of the machine in the manner described. The outward motion of the arms 101, 102, 103 and 104, is limited by the inner portion of the brackets 105, immediately below the point where they are supported by their hinges 105$^a$ primarily, without which provision, the arms would only be limited in their outward swinging action by the surrounding mechanism relating to the forming device.

Thus, while the tilting arms, one of which is shown in Fig. 11, are pressing the shooks against the arm, they remain in the position in which they are there shown until the arms have passed below the upper level upon which the shooks have been assembled. Upon each of the forming arms 101, 102, 103 and 104 projecting from the shook contacting sides thereof, are the two adjustable dogs 105$^e$, (see Figs. 24, 25 and 27), which are attached to a sliding block 105$^h$ incased within each of said forming arms and are fitted to slide within the vertical slots suitably cut within the said faces of said arms. The blocks carrying these dogs are operably supported at the ends of the threaded shafts 105$^g$, which extend up through a correspondingly threaded orifice at the top of said arms 100 so that the threaded shafts 105$^g$ may be turned by means of an ordinary screw driven to cause the blocks carrying the dogs 105$^e$ to slide longitudinally within the arms, to any required position to set the square shook contacting face of said projections at the top edge of the shook to be engaged thereby according to the various widths thereof.

At the lower end of each of the forming arms are sliding angular extensions 106$^i$ which are held in place by the shoulder screws 106$^j$, extending through the longitudinal slots in said angular extension. These extensions are so disposed that their outer edges are designed to be flush with the corresponding outer edges of the horizontal bars against which the shooks are pressed while being carried downwardly into the lower or nailing level, so that as the arms approach the bottom these extensions by virtue of their slotted connections with the arm may slide longitudinally thereof, to the shortened position shown in Figs. 6 and 7 or as shown in Fig. 10, these extensions may be allowed to drop to their extended position, where they will be supported by screws 105$^i$. Thus the extended portion of the arm serves to receive the shooks when brought into contact with the arms 100 which normally stand with their lower ends slightly above the floor 33 upon which the shooks 25 and 26 are transferred to the arms. Therefore, as the arms descend, these sliding extensions reach the bottom pieces first, and hold until the arms 100 have been brought to the lowest limit of their stroke. The action of the yielding arm extensions, is further beneficial in preventing undue strain of parts or the breakage of material acted upon by the arms in case of inadvertent displacement of the pieces comprising the box, or irregularities due for example to unusual thickness of the bottom. In all such cases, the extensions amply compensate for the possible variations presumed.

These four vertical arms, 101, 102, 103 and 104 constitute what may be termed the inner forming members, which as has been seen exert an outward spring pressure upon the shooks that are brought against them to make the frame of a box, first, in resisting the action of the tilting arms as they are held in the upright position shown in Fig. 10 from which position the shooks are carried downwardly, and secondly, as the inner arms 101, 102, 103 and 104 descend they press the shooks outwardly against the devices of the outer forming mechanism next to be described.

In order to retain the shooks in the desirable position in which the tilting arms 55 have delivered them until they finish their downward stroke and rest upon a bottom piece 27, outer guiding bars 131, 132, 133 and 134 have been provided (see Figs. 5, 12, 13, 16 and 19) which extend from the level upon which the shooks have been assembled, down to the level upon which the bottoms are advanced and where the nailing occurs. These members, in fact, form a double function, first, in guiding the four corners of the frame of the box, which has been assembled in substantially a rectangular form at the upper level, retaining them in said position as they descend into the nailing level, and secondly, in guiding and controlling the nailing mechanism which is brought into action while the frame is still held within the four corners of said outer guiding members 131, 132, 133 and 134, and has now been placed upon the bottom piece 27.

More particularly described, the outer forming members consist of what may be called shook guiding plates $131^a$, $132^a$, $133^a$ and $134^a$ which are attached at right angles to the outer edges of the nail chuck supporting plates $131^b$, $132^b$, $133^b$ and $134^b$, into the corresponding vertical slots $131^c$, $132^c$, $133^c$ and $134^c$ (Figs. 17, 19 and 20) into which are adapted to be fitted the square noses of the respective nail chucks 200, which are required for nailing on the ends at that corner of the frame to which the respective outer members relate, said nailing chucks being adapted to slide vertically within their respective slots and are rigidly secured therein by means of a shoulder screw $131^d$ at whatever height required by the dimensions of the particular box, being made thereby.

The outer guide members 131, 132, 133 and 134 are attached at their tops to the inner ends of the shook guiding bars 33, upon which the end shooks 25 are supported and conveyed to the forming mechanism, the right hand rear member 131 being rigidly attached thereto, the front member 132 by a single pivotal support permitting lateral swinging motion, the other two each being pivotally attached thereto by a double jointed member $131^e$ connected to the chuck supporting plates $131^a$, $132^a$, $133^a$ and $134^a$ of the said outer forming members. The pivotal member $131^e$ is connected by one pivot to said bar 33 and by its second pivot at right angles to said plates $133^a$ and $134^a$ of the corresponding outer member, so that each of the members 131, 132, 133 and 134 may be given movement in two directions, laterally and lengthwise of the box being formed thereby. The inner faces of the chuck supporting guide members $131^a$, $132^a$, $133^a$ and $134^a$ are flush with the inner ends of the bars 33 and form a continuous guiding face with the tilting bars 55 when in their vertical position as shown in Fig. 11, so that as the end pieces 25 are carried downwardly from the position as shown in Fig. 11, they continue to be outwardly guided by the faces $131^a$, $132^a$, $133^a$ and $134^a$ respectively of the chuck guiding plates of the outer forming members 131, 132, 133 and 134, being pressed outwardly against the plates by the arms 100 until the nails are driven.

Thus it has been seen that each of the outer forming members 131 has two shook-guiding plates, arranged at right angles one to the other, comprising the faces $131^a$, etc., which relate to the ends 25, and the faces $131^c$, which similarly relate to the sides 26. It has also been seen that the inner guiding faces of the nailing chuck bearing plates $131^a$ are in substantial alinement with the adjacent ends of the guiding bars 33 of the end shooks 25. In the same manner and for the same purpose the inner faces of the plates $131^c$, $132^c$, $133^c$ and $134^c$ are brought into correspondence with the shook guiding ends of the similar bars 33 of the side shooks 25, and therefore may be termed the side guiding walls.

The said guide walls pertaining to the side shooks at the rear portion of the machine, namely the angular guide plates $131^c$ and $134^c$, in the form of my invention now being described, are rigidly attached to the corresponding members $131^a$ and $134^a$, which hold in vertical alinement the end nailing chucks 200, and do not extend all the way to the bottom of the grooves $70^a$ and $71^a$ for the reason that the bottom shooks are advanced under the nail forming mechanism, and therefore space enough has been provided for the bottoms to pass safely under the lowermost ends of said guiding plates. The similar side guiding walls $132^c$ and $133^c$, however, which relate to the side shooks that are assembled at the front of the machine are hinged door-like to the corresponding chuck supporting shook-guiding members $132^a$ and $133^a$, having been made in this form in order that they may swing outwardly to permit the manufactured box to be ejected laterally as it is advanced within the grooves $70^a$ and $71^a$ which as has been already pointed out, extend to the extreme front side of the machine. The swinging guide members, or as they may be called, the doors $132^c$ and $133^c$ on the other hand, have their operable walls extending all the way down to the bottom of the grooves $70^a$ and 71ᵃ upon which the bottoms 27 rest in the form of latches 140, which are allowed to yield against the action of their compression springs 141, as their beveled portion 140ᵃ contacts with the outer edge of the recess 70ᵃ and 71ᵃ when the doors are swung outwardly in emitting the completed boxes.

The vertical end plates 131ᵃ, 132ᵃ, 133ᵃ and 134ᵃ of the outer forming members, portions of which have been seen to be connected at their tops by a double acting pivotal bearing one at right angles to the other, for the purpose of giving flexibility to those vertical bars in two directions first, while bearing against the end pieces of the box, and accommodating the forming parts to whatever irregularities may be present in the shape of the side pieces upon which said end piece is being held by said plates; and, secondly, to allow similar slight adjustment to meet the requirements of lateral variations, and in addition to such slight lateral movement, permitted in the action of the vertical guide bars 131ᵃ, the two members 132 and 133 are given a distinct swinging motion upon the second pivotal connection at the top to allow sufficient over-run, in feeding the bottoms into the forming mechanism, to insure their being properly lodged upon their retaining detents 142 at the back of the machine. Therefore, the rectangular extensions 135 which are slidably fitted into horizontal slots 136, in the bars 70 and 71, have the extensions 135ᵃ against which compression springs 135ᵇ are adapted to hold the outer guide bars 132ᶜ and 133ᶜ against the action of the bottom advancing mechanism, which is carrying into the forming and nailing mechanism a bottom 27 whose forward edge is in connection with the latches 140, which it has been pointed out reach to the bottoms of the grooves 70ᵃ and 71ᵃ. Hence, as the bottom advancing sprocket pawls recede the action of the compression springs 135ᵇ through the contact of the latches 140 of the doors 132ᵃ and 133ᵃ, operate to carry the bottoms 27 back against the permanent detents 142 on the rearward pair of outer forming guides 131 and 134, which detents drop their free ends into the respective grooves 70ᵃ and 71ᵃ as the bottoms are carried beyond the point at which they are located.

The outer forming bars 131 and 132, at the right hand end of the forming mechanism, are relatively fixed at both their upper and lower connections as regards endwise movement, being attached at their lower ends to the horizontal guiding bar 70, which as has been seen, is attached to the transverse bed plate 120 that is fixed to the frame work.

The two outer forming members 133 and 134 at the other end of the forming mechanism, are held yieldingly at their lower anchorage both as to endwise and lateral movement, each being held within its respective rectangular grooves 136, longitudinally disposed in lateral movable member 71, of the skeleton bottom of the forming mechanism. Therefore, these forming members 133 and 134 are carried to whatever position the bar 71 may be moved laterally in fitting itself to the respective ends of the bottom that has been carried along the grooves 70ᵃ and 71ᵃ. Furthermore, independently of the action thereon of such lateral shifting of the horizontal guide bar 71, the bottom ends of the vertical guide bars will, it is obvious, each move longitudinally of the said bar within its respective slot 136 therein irrespective of the movement of the other. That is to say, as the horizontal bar 71 in accordance with the superficial conformation of the bottoms 27 held thereby, may carry the lower ends of the outer guide members 133 and 134 inwardly or outwardly, singly or together, those members may at the same time have their lower ends swing toward each other, or oppositely, or in parallel, depending upon the outlines of the end pieces held therebetween. As has been pointed out the bar 71 given its yielding lateral motions by two compression springs 71ᶜ each suitably attached to the frame at one end and at the other end to said bar at its respective ends, holding the same against stops in the form of shouldered studs upon the supporting bar, which extend upwardly into transversely disposed slots in the said bar 71. The means for effecting the adjustable movement of the bars within respective slots will next be described more in detail.

The forward outer forming member 133 at the left hand end and front of the forming mechanism has the compression spring 135ᵇ by means of which it will be carried in the direction of the corresponding rear vertical guide bar 134, as far as its side plate 133ᶜ will permit it to go on coming in contact with an end shook 25 thus held against the said rear side plate 134ᶜ of the corresponding outer forming member 134. The outer forming members 133 and 134, at the left hand end of the machine, having their lower ends operably located by the horizontal bar 71, that is, in turn position by the incoming bottom, they, the said forming members 133 and 134 will therefore guide the end piece 25, held against the respective faces thereof by the inside forming arms 103 and 104 as they carry the said end piece downwardly, so that it will be placed upon the bottom, flush with the left hand edge thereof. And, as the faces 133ᵃ and 134ᵃ are thus guiding the end piece 25 the lateral guiding faces 133ᶜ and 134ᶜ respectively are guiding the respective ends of said end piece into like registration with the corresponding side edges of the bottom piece for the reason it will be recalled, that the latch extension 131 has its inner or shook engaging surface made to coincide with the corresponding side guiding face 133$^b$. Hence as the outer guiding member 133 is carried toward the rear member 134 by action of its spring 135$^b$ both the bottoms and end pieces will be carried back against the detent 135$^d$ whose forward or shook engaging end is flush with the corresponding shook engaging face 134$^c$ of said outer forming member 134 to complete the flexible construction of this feature of the forming mechanism. In like manner the outer forming members 131 and 132, at the right hand end of the forming mechanism guide the end shook 25 at the end of the machine into registration with the opposite end of the bottom 27, except that the bar 70 is stationary and the rear forming member 131 is fixedly attached at its bottom end to said horizontal bar 70.

It has already been pointed out that the end pieces 25, have been placed upon the respective ends of the side piece 26, at the upper level of the machine in the process of forming the frame, in order that the ends may be registered in accordance with the respective end and side edges of the bottoms. It is therefore apparent that as the side pieces 26 are held between the end pieces 25 and guided by the outer forming members 131 and 132, 133 and 134, said sides 26 are necessarily brought into the same relative registration or alinement as are the ends 25 with the respective side of the bottom piece 27, upon which they are placed by the forming mechanism.

It has also been seen that the side pieces 26 were placed against the respective bars 101, 102, 103 and 104 by the tilting arms 55, and immediately thereafter, the end pieces 25, are in like manner placed against different faces of the forming arms by their respective tilting arms, which, as they yield against the action of the outward spring pressure of said arms eventually place the end pieces to bear directly against the respective ends of the side pieces to form the frame of the box. When the end shooks come into contact with the side shooks, it is evident that the outward pressure of the inside forming arms ceases to supply the necessary opposing pressure to hold the ends 25 against the tilting arms 55 which have placed the end pieces thereon. Hence, as the arms 100 are carried downwardly to the forming and nailing level it is desirable to obtain lateral frictional pressure for holding the end shooks in position with the respective ends of the side shooks, and accordingly a presser-lever 55$^a$ is pivotally attached to the outer end of each of the bars 55, which relate to an end shook 25, (see Figs. 10, 11 and 13) and are provided with compression springs 55$^b$, which tend normally to force the presser-levers 55$^a$ in the direction of the respective forming arms 101 and 102, 103 and 104. In operable length these spring yielding levers 55$^a$ do not extend to the bottom of their respective tilting levers 55, but below the point that measures the minimum width of the end shook to be operated upon thereby. In practice, presser levers of the kind indicated may be supplied to the one end of the mechanism as it is evident that sufficient pressure may be exerted thereby to hold in place the end shook 25, against which they come into immediate contact will be transmitted through the side pieces of the frame to the opposite end shook, so that it will cause that member to be held with equal frictional pressure against its lever arms so that all the parts will be retained in proper relative position until carried into the hands of the outside forming bars 131, 132, 133 and 134.

A similar provision has been made for holding the end pieces by frictional contact as they enter within the scope of the forming lower mechanism, consisting of the presser levers 130, attached near the top of each of the guiding faces 131$^a$ and 132$^a$, 133$^a$ and 134$^a$ respectively in a similar manner to that in which the levers 55$^a$ are attached to the tilting bars 55, which levers 130 are adapted to force the ends 25 in the direction of the corresponding inner forming bars 101 and 102, 103 and 104 and otherwise act in the same manner and perform the same function as the presser levers 55$^a$, and, likewise, two of said levers 130 at one end of the forming mechanism may be found sufficient to hold both end pieces 25 in place until they reach the bottom 27 to which they are to be nailed.

At the top of each of the side guiding plates or doors, 132$^c$ and 133$^c$ of the respective outer forming members 132, and 133, which it has been explained swing outwardly to allow the manufactured box to be ejected, are provided means for holding said doors in guiding relationship normally at right angles to the end guiding surfaces of the nail chuck guiding plates 132$^a$ and 133$^a$ of said outer forming mechanism. This mechanism consists of a locking device, comprising a latch 144 (see Fig. 21) suitably pivoted to the brackets 22 and 23 respectively, between lateral guiding walls 144$^b$ so that the free end or each normally rests with its side against the top of its respective door 132$^b$ or 133$^b$ when in its closed in normal guiding position, being held in such engaging relationship by means of the springs 144$^c$ suitably attached to the respective brackets 22 and 23. To release the doors 132$^b$ and 133$^b$ from their locking devices a stud 145 projecting from each of the front vertical slides 106 is adapted to contact the undersides of the respective lift-latches 144ª, as the said slides come to their extreme upper or normal place of resting, thereby lifting the latches and unlocking the doors in order to permit them to open outwardly as the box is ejected by means of the detent 82ª upon the sprocket chain 82.

The nailing mechanism.

The nail selecting and the nail driving mechanisms necessary to complete the cycle of operations in the practice of my invention are similar to the means usually employed for such purpose in machines of this class, and accordingly I use ordinary nail driving chucks 200, 205 and 210 each having yielding jaws at its end for guiding nails as they begin to enter the wood, which guiding jaws yield oppositely and equally in opening to allow the head of the nail and the plunger which is driving it into the wood to pass therebetween, as the nail is driven home, the length of the respective guiding faces of the jaws being limited primarily with reference to the length of the nail to be guided thereby.

Through the longitudinal axis of the body portion of the chuck is a tubular opening, terminating at the inner portion of the jaws, which serves as a guideway for the plungers which reciprocate therein, and, normally are withdrawn to a point sufficiently back of the jaws to form what may be termed a nail receiving chamber, slightly longer than the nail to be driven thereby. These plungers are held in their normal position of rest by means of compression springs, suitably disposed upon their stems, and held between the body of the chuck and the head of the plunger.

The plunger as it is forced longitudinally in the direction of and through the nail receiving chamber advances the nail lying therein, its point entering between the jaws and being guided by the beveled portions thereof into the longitudinal grooves formed in the oppositely disposed nail engaging surfaces of said jaws. The jaws being held firmly by springs upon the top of the nail as it is forced lengthwise through the grooves of the jaws, holds the nail in perpendicular relation to the material into which the nail is being driven until the head of the nail approaches the jaws whereupon they yield sufficiently against the spring action thereof to allow the head of the nail and the end of the plunger in contact therewith to pass between the jaws driving the nail into the wood as may be desired.

I also employ ordinary type of nail selecting hoppers and inclined chutes, for selecting nails and holding them in alinement with provision for moving the end or bottom nail thus held from its position in the chute, transferring it to the nail conducting tubes, which convey the nails into the longitudinal receiving chambers provided in the driving chucks which have already been referred to. To conduct nails by means of tubes is also a well-recognized practice, although the use of tubes for this purpose in most instances has been limited practically to apparatus in which nails are conducted in a substantially vertical direction by action of gravity, in which position they rest upon their points until acted upon by the nail driving plungers. But when it is desired, as in the preferred embodiment of my invention, to drive nails either horizontally or in an upward direction, against the action of gravitation, additional means must be resorted to, mechanical or otherwise. In my preferred form, I employ in connection with the nail conducting tubes pneumatic means by which the nails are not only conducted downwardly but in any desired direction, however tortuous it may be found necessary or convenient to lay out the course to be followed thereby, to reach its driving chuck.

The air blast as used in connection with my invention not only conveys the nails through tubes without reference to the direction thereof, but furthermore it carries the nails into their temporary resting chambers, and there holds them until acted upon by their respective plungers, whether sustained vertically against the action of gravity or held horizontally against rebound from the force of gravity, which has frequently been found to interfere with the practical operation of mechanisms of this class.

I shall therefore include in my specification, the details of the pneumatic means employed in connection with the preferred form of my invention, as a part of the nailing mechanism and shall include also those features designed to effect the desired location of the nailing chucks, and the means employed for connecting the chucks with the forming mechanism of which they conveniently form a part, together with the adjustment of the chucks as to the different sizes of boxes to be made, and the different shapes and dimensions of materials used in making the boxes.

Referring back to the forming mechanism, in connection with which it has been seen that the several pairs of tilting levers 55 by substantially simultaneous actions place the side shooks 25 and the end shooks 26 against the forming arm, or more particularly described, certain of the tilting arms are adapted to place the end shooks 25 against corresponding ends of two side shooks 26 against the forming arm, with the four rectangular arms 101, 102, 103 and 104 pressing outwardly at their respective corners. As has been pointed out this relative arrangement of the ends and side pieces is effected by means of causing the tilting arm relating to the sides to operate slightly in advance of those forming the ends, so that the latter pieces come into place resting against the respective ends of two side pieces, it being taken into consideration that certain forms of boxes, such as those intended for cigars, for example, have their end pieces 25 nailed to the ends of the so-called side pieces 26 as above described, whereas in many other kinds of boxes the sides are nailed upon the edges of the end pieces. In the operation and construction of the mechanism as here described, it is immaterial whether the ends or the side pieces overlap the others, it only being necessary to have the overlapping pieces whether long or short supplied to the hoppers upon the sides of the machine where the end nailing chucks are located, inasmuch as the nailing chucks 200 relate only to the frame proper and drive their nails through the end pieces into the ends of the side pieces.

The nailing chucks 200 which are employed in making the frame proper consisting of the end pieces 25 and the side pieces 26, are grouped at the respective corners of the forming mechanism, slidably supported in vertical slots 131$^b$, 132$^b$, 133$^b$ and 134$^b$ in the guide plates 131$^a$, 132$^a$, 133$^a$ and 134$^a$ respectively, of the outer forming members 131, 132, 133 and 134. Preferably at least two of these chucks are located at each corner, each of which have upon the forward end of their body portion rectangular projections 201 (see Figs. 17 and 20), which are adapted to slide vertically within the respective slots in the guide plates 131$^a$, a screw 202 having been fitted in a correspondingly threaded orifice in each projection 201, having a flat head adapted to fit into corresponding countersunk recesses at the side of said slots, into which the screw head is fitted in the usual way. Therefore, in tightening the screw it will draw the guiding projection 201 into its slot until the shoulders 201$^a$ of the chucks are brought against the plate 131$^a$ on the side opposite to the screw head thereby bringing the chuck to which it pertains into square alinement with the plate of the respective outer guide members 131 and 134.

The slots 131$^b$ and 134$^b$ relating to the rear forming members 131 and 134 respectively are in parallel arrangement with the guide plates or lateral gages 131$^c$ and 134$^c$, so that the nailing chucks are always held in vertical parallel alinement with the side shook into which their nails are to be driven, when the ends of said shooks are held laterally against said gage plates by the outward pressure of the corresponding vertical or inner arms 101 and 104 respectively. In this manner, the nails driven by said chucks 200 are brought into registration with the thin side pieces into which they enter after having passed through the end pieces, so that notwithstanding any slight irregularities or variation in the shape of the end pieces the chuck supporting bars 131 and 134 will be brought into accurate correspondence with the side piece to which the end piece is being nailed.

The chucks 205 and 210 employed in nailing the bottoms to the underside of the frame have their body portions arranged vertically with the nail guiding jaws at the top, so that the nails driven thereby are forced upwardly through the bottom 27 into the adjacent edges of the frame. The chucks which nail the bottoms to the end pieces 25 for convenience will be termed the end bottom chucks 205, and those which in like manner drive their nails into the side pieces 26 through the bottoms may be called the side bottom-chucks 210. In the present form of my invention I employ only one bottom chuck 205 at either end, but two bottom chucks 210 at each side of the box to be made thereby and will refer to them in the order given.

The chucks 205 are supported upon brackets 205$^a$ attached to the respective bars 70 and 71, to which they relate, which brackets have the guiding ledges 205$^f$ that are adapted to fit into corresponding grooves 205$^d$ transversely disposed in the body of the said chucks. The chucks 205 also have screwed to their respective tops a rectangular guiding extension 205$^a$ which fits within corresponding grooves 207 longitudinally disposed in the guide bars 70 and 71 respectively. (See Fig. 13.) The location of the rectangular extension 205$^a$ upon the end of the chuck is so placed that when inserted within the slot 207, the jaws 205$^b$ of the chucks 205 enter through similarly disposed longitudinal slots 205$^c$ through the bottom of the respective grooves 70$^a$ and 71$^a$ in the bars 70 and 71, said slots 205$^c$ may be made slightly wider than the width of the jaws protruding therethrough to effect a slight lateral adjustment of the jaws within said grooves, when required in connection with varying thicknesses of material. This so-called lateral adjustment of the end chucks 205 would be obtained by having rectangular extensions 205$^a$ attached to the chuck by means of screws which pass through a slightly enlarged hole in the extension 205$^a$ permitting a limited transverse movement in adjustment of the body of the chucks relating to the bars 70 and 71. Thus held, vertically upon its supporting bracket 205$^e$, each of the end bottom-chucks is held by means of its end extension 205$^a$ in proper adjustment for a given thickness of end shooks 25, and if it is required to remove the chuck 205 to any given point longitudinally of the end 25, a set screw or any ordinary clamping means, can be employed to screw the chuck to its said guiding ledge 205ᶠ at any desirable point along the same.

While only one end-chuck is shown, it is obvious that there may be more than one as may be required and that any convenient number may be employed for positioning them relatively to their guiding walls 207.

The side bottom-chucks 210 which drive their nails through the bottoms into the side pieces 26, are slidably supported upon brackets 212ᵃ which are themselves adjustably supported in longitudinal slots 212ᵇ, in the vertical supporting bars 70ᵃ and 71ᵃ respectively. The rectangular projections 212 upon the sliding brackets 212ᵃ are adapted to fit into transverse slots 211 in said chucks 210, furnishing means for adjusting said chucks relatively to the length of said guiding projection 212, which extends in a direction at right angles to the guiding surfaces of said bracket. The brackets supporting said chucks fit into the grooves 212ᵇ on the bars 70ᵃ and 71ᵃ, as described, and means are thereby supplied for changing the position of the chuck in accordance with the distance from the end of the box at which it is desired to drive the bottom nails along the bottom. Or, if required to increase the number of nails in a given side, additional chucks 210 may be attached upon the rectangular projection 212 to that end.

In order to maintain a fixed relationship between the position of the bottom chucks 210 and the gage plates 131ᶜ, 132ᶜ, 133ᶜ and 134ᶜ the bracket arms 213 are provided (see Fig. 13) which are being suitably attached to the respective vertical plates 131ᵃ, 132ᵃ, 133ᵃ, 134ᵃ of the outer guide members, and are so disposed that the rectangular guiding projections 212 of the sliding brackets 212ᵃ extend horizontally in a parallel direction with the side shook 26 when the latter is held against the respective guide walls 131ᵇ and 134ᵇ or 132ᵇ and 133ᵇ at the back of the front and rear portions of the forming mechanism respectively.

The horizontal guiding arms 212 of the bracket 212ᵃ being thus arranged, hold the chucks 210 at all points along the length of each horizontal arm in unvarying relationship to the line of the shook at the side of the machine to which these guiding extensions relate, it being only necessary to construct the body of the chucks 210 with regard to the location of the guiding means, so that their nail guiding jaws are brought directly under the bottom edge of the side to which they relate. Hence it will be seen that when, in the manner described, the lateral guiding plates 131ᶜ and 134ᶜ at the rear of the forming device and the similar guiding members 132ᶜ and 133ᶜ at the front have been brought into adjusted position with relation to the thickness of the respective sides to be operated upon, that said guiding members, upon being brought by action of their respective compression springs firmly against the ends of the end pieces 25, they not only bring the side chucks 200 into proper alinement with the edges of the side pieces to be ultimately nailed thereby, but also simultaneously place the side-bottom chucks 210 in similar relation with the bottom edges of said side pieces 26. The end bottom chucks 205 at the same time are brought into accurate registration by means of their position within the end guiding grooves in the bars 70 and 71.

*Nail selecting and conducting mechanism.*

In my present arrangement the end nailing chucks 200 are seen to receive their nails and hold them in a relatively horizontal position while the respective nail driving plungers are brought into action to force the nails held thereby into the wood. It has also been seen that the chucks employed for driving the nails into the bottoms of the shooks drive their nails vertically upward, hence there arises the necessity for holding the nails in such horizontal and vertical position while bringing the plungers into contact therewith, to force the nails home. In order to describe this mechanism fully it will be necessary to point out briefly the portions of the nail selecting mechanisms together with the means for conducting the nails selected thereby into the respective nail chucks with reference both to the horizontal and vertical chucks.

The nails are conducted into the chucks by means of tubes 215, each chuck having a separate and independent tube connecting it with the nail selecting mechanism, and I will now describe the means employed for selecting the nails in use with my present invention.

I employ the usual nail hoppers 214 which are suitably supported upon a rock shaft 256, rotatably mounted upon brackets 226ᵃ upon the posts 226, which hoppers consist of the square box construction into which nails are thrown loosely in general disorder, and by means of the rock shaft 256, are successively elevated and lowered so as to move the nails back and forth therein so that as they are carried to forward end at each forward vibration of the hopper, a portion thereof drops into the longitudinally arranged grooves in the end of the hopper to pass thence into the vertical slots in the chute casing 216 suspended by their heads within parallel vertical slots 219 therein. At the bottom of the casing 216 is a reciprocating slide 217, provided with notched recesses 218, into which the lowermost nails within the several slots 219 of the casing 216 rest, such notched recesses having sufficient depth to contain one nail only. Reciprocal motion is given this notched slide sufficient to carry said lowermost nails out of the lines in which they are held within the chute casting, into corresponding inner tubes 220 of large enough diameter to receive the head of the nail to be precipitated therethrough. The inner tube 220 extends downwardly into somewhat enlarged upper ends of the nail tubes 215, each of which tubes terminates in a nail driving chuck 200, 205, or 210, in the lower part of the machine, in the manner already described.

*Pneumatic nail controlling mechanism.*

In connection with the nail conducting means employed in the operation of my invention, I provide pneumatic pressure, and for the purpose of introducing the air into the nail tubes 215 I have the above mentioned inner tube 220 enter the top portions of the nail conducting tubes 215 to carry the nail below the point of the introduction of the air blast into the nailing tubes 215. Hence, as the air is first introduced into the tubes 220 through the apertures 222 which are located at the top of the tubes 215, at a point above the lower end of said inner tubes 220, the apertures 222 open directly into the air chamber 224 in the casting 223 which is connected with the source of supply, and in which all of said tubes 220 are arranged in lateral alinement, said apertures 222 constituting the sole connection between the air supply chamber 224 and the tubes 215. The short inner tube 220 is thus seen to extend downwardly beyond the point of the opening 222 so that the air introduced into the chamber 222 surrounds the tubes 220 and passes downwardly beyond the lower part of said tube 220 to the end of the tubes 215.

The air chambers 224 and 224$^a$ of the castings 223, are independently connected by similar pipes 225, which run through the respective posts 226, which are hollow, to conduct the air to the chambers 224 and 224$^a$ from its source of supply, which may be kept in any suitable reservoir and thence connected directly to the usual means employed for generating gaseous pressure, which with satisfactory result in the practice of my invention has been supplied by a continuously operating rotary compressor 229.

It is apparent that in attaining these ends broadly the pressure applied may be continuously introduced into each of the tubes inasmuch as the general course of the air through all of them is conducted within the tubes in the direction of the travel of the nails. However, in practice it has been found desirable to control the air currents to prevent the loss of pressure incident to its escape through the chambers 220, and to this end I have employed a reciprocated slide 235 to close the tubes when the nails have passed through, which slide is suitably housed within the casting 216, having a series of openings 236, which correspond in number and arrangement with the openings in the upper chambers 220, so that when the openings 236, are thus brought into correspondence with those on said chambers, a continuous unbroken path is opened for the uninterrupted passage of the nails therethrough, but when moved a distance slightly greater than the width of the openings, the slide operates to close the tubes entirely at the top against back pressure of air, and the full force thereof may thus be introduced into the mechanism employed in conducting the nails therethrough.

It has been found desirable still further to control the air pressure so as to bring it into successive operations in connection with, first, the horizontal chucks for example, and then secondly, cutting off the supply to those chucks, and applying the full pressure to the bottom chucks, with provision for maintaining the pressure upon either class of chucks through whatever period required. This arrangement is especially advantageous in my present embodiment where the bottom chucks are employed in driving the nails upwardly and therefore requiring a greater pressure which must necessarily be prolonged until the plungers actually come under the nails to drive them into the box. The duct by which the air pressure is carried through and into the chucks unites in a Y-joint with the nail chamber in which the plunger reciprocates just at the point below where the nail rests, so that the air pressure may not be cut off by the action of the plunger until that member is in position to support the nail resting upon the end thereof.

To regulate the application of the air pressure thus to different sets of chucks, a rotary device 230 has been employed, which comprises two oppositely disposed circular chambers 231 and 232, in axial alinement upon a supporting base, the former being divided into three radial or segmental compartments 231$^a$, 231$^b$ and 231$^c$, two of which in the present form of my invention are connected with the nailing chucks as follows: The chamber 231$^a$ by means presently to be described, with tubes that connected with the horizontal chucks 200, and the chambers 231$^b$ is in like manner connected with tubes that communicate with bottom chucks 205 and 210.

Fitted over the chambers 231$^a$, 231$^b$ and 231$^c$ is a rotatable disk 233 which has an orifice 233$^a$ located near the circumference of the disk and adapted to provide successively an opening into chambers 231$^a$, 231$^b$ and 231$^c$ as the disk rotates. The disk 233 keyed upon a shaft 234 operably mounted in suitable journal bearings within the said chambered members 231 and 232, respectively, constitutes the only separation between the respective members 231, having the said sectional divisions 231ª, 231ᵇ and 231ᶜ on the one side thereof and the chamber 232 on the other, between which the sole means of communication is the orifice 233ª in the disk 233 that is always in communication with the said chamber 232. Therefore as the disk 233 rotates, the air is successively connected through the orifice 233ª with the chambers 231ª, 231ᵇ and 231ᶜ; and thus the source of air supply which is first introduced in the chamber 232 may be conveyed successively into these different chambers which in turn it has been seen communicate with one or the other sets of brackets in the manner indicated.

It is obvious that by modifying the circumferential length of the various chambers 231ª, 231ᵇ and 231ᶜ the relative time during which the air is conveyed to one set of chucks may be controlled with relation to the time with which the air may be conveyed to the other of said sets of chucks.

*The nail driving mechanism.*

The nail driving mechanism consists of the usual chucks which have already been referred to, each of which may be said to have a body piece 240 (see Figs. 17, 20 and 21) in which a plunger 241 is adapted to reciprocate within an opening 242, along the longitudinal axis thereof, terminating at the forward end of the chuck body where a pair of yieldable jaws 243 are located. In the jaws are longitudinal nail guiding grooves 242 when the jaws are held firmly together by means of compression springs 245. The plungers 241 extend beyond the body portion of the chucks, and has at its outer end, the flattened head 241ª between which and the body of the chuck is a compression spring 241ᵇ, that is adapted to return the plungers to their normally extended position to withdraw them from the nail containing portion of the plunger guarding bore of the chuck.

The nail plungers are actuated, that is, are forced forward to drive their respective nails out of the chucks into the boxes by means of cam operated reciprocal plates with plane faces which for convenience may be referred to in connection with the present embodiment of my invention as vertical and horizontal nailing plates, having reference to the direction of their respective nail driving motions. The horizontal nailing plates 250 are, in the present form of my machine four in number, two at each end of the box forming mechanism and each is provided with a sliding portion 251 that fits into longitudinally disposed guides in the inner faces of brackets 21 and 22, at one end of the machine and in like manner upon the brackets 23 and 24 at the other side of the machine. (See Figs. 1, 2, 4, 5, 7 and 13.) The nail driving faces of the slides are at right angles to the direction of their movements and of sufficient width and height to contact the flattened heads 241ª of the plungers of each of the horizontal nail chucks 200, which as has been seen are arranged in vertical alinement at the respective ends of the forming mechanism, two or more at each corner thereof.

The plunger contacting faces 253 of the so-called horizontal nail driving plates 250 (Fig. 13) are disposed at right angles to the direction of the sliding movement, said surfaces 253 being arranged in vertical alinement as has been seen immediately back of the plungers of the horizontal nail chucks 200, the length of these faces being sufficient to operate the plungers 241 of the uppermost chucks in its highest position when operating on boxes of maximum height, and of sufficient width to insure their contacting with the head 241ª of the nail plunger 241 of said chucks 200.

The horizontal nail plates receive their reciprocal motion by means of vibrating lever 255, (Figs. 4 and 7) with cam roll 254ª adapted to contact oppositely disposed slotted portions 254 vertically arranged on the inner sides of each of said nail plates 250. The lever arms 255 are secured to similar rock shafts 256, suitably supported upon brackets on the transverse bed plates 120 and 121 at the respective sides of the machine, to each of which shafts is keyed a cam lever arm 257, having a cam roll 258 on the free end thereof which is adapted to contact the cam surface 259 of which there are two similar slide actuating cams on the main shaft 10, that at the right side being keyed to the shaft and that at the left keyed to the sleeve 124 which is splined to said shaft and moves longitudinally thereof along with the slidable bed plate 121, as has been explained in another connection, retaining the operable relationship therewith throughout the various adjustments to such bed plates is slid on the frame 1. Thus means are provided by which the shafts 256 are made to rock, thereby causing the levers 255 to vibrate, which in turn reciprocate the nail plate 250 to operate the nail driving plungers of the horizontal chucks 200.

The cams 259 as illustrated are of the open face construction, and therefore the cam lever arms 255 are provided with spiral springs 111ª, which, as has already been explained in another connection are operably attached to said lever arms and similarly connected at their opposite ends to the lever arms 111ᶜ upon the rock shafts 115 and 116 respectively, employed in connection with the slides that reciprocate the forming mechanism. These springs 111ª therefore operate to draw the levers 255 in an outwardly direction so as to return the horizontal nail plates 250 to their normal position of rest thereby permitting the nail plungers to be opened by the action of their springs in order to receive new nails to be driven into the boxes.

On each of the rock shafts 256 as pointed out, are two lever arms 255, operably connecting with two similar nail plates 250, that are slidably attached to brackets 21 and 22 at one side of the machine, and a like pair of nail plates 250 attached in the same manner to the brackets 23 and 24 at the other side of the machine. Two of said brackets 21 and 24, which it has been seen are at the rear of the machine and are not moved relatively to the direction of the respective rock shafts 256, to which are attached the nail plate operating levers 255, and hence the lever arms 255 relating to the stationary nail plate slides (at the rear) are keyed to their respective rock shafts, while the other lever arms 255 are slidably attached to said rock shafts. The slidable lever arms 255 are therefore thus provided to travel with the brackets 23 and 24 to which they respectively relate, when those brackets are adjusted to different widths of box, these two lever arms being provided at either side with a longitudinal sliding collar at the end of bracketed arms suitably depending from said brackets 22 and 23, which bracket arms as they are moved longitudinally of the rock shaft carry the levers 255 along with the brackets 22 and 23 to their adjustments.

The bottom chucks 205 and 210 are arranged above the horizontally disposed faces of the so-called vertical nail driving plates 260 which are adapted to travel vertically in guides carried by the bed plates 120 and 121, upon which rest the movable brackets 22 and 23. (See Figs. 4, 5, 6, 7, 12 and 13). The vertical nailing plate on the right hand end of the machine is guided by the bracket 261 (Fig. 7) directly attached to the side of the bed plate 120, while the similar nail plate on the left hand side of the machine is guided by means of a bracket extension 262 attached to the bracket 125, which for purposes hereinbefore described is directly secured to the under side of the slidable bed plate 121, and extends downwardly to the line shaft 10 having a loosely mounted bearing thereon, at the under side whereof is a pin 262$^a$ that extends upwardly into an angular groove 262$^b$ in the hub of the cam 269 upon which it is operably supported, as will be more fully hereinafter described.

Upon the side of the body portion of said vertically driven nailing plates 260 are the cam rolls 266, pivotally mounted upon shoulder screws or studs 267, said rolls being adapted to ride upon the peripheries of the two profile egg-shaped cams 268 and 269 respectively which support said nail plates as they are guided upon their respective brackets. The cam 268 on the right hand end of the machine is keyed, but the cam 269 is secured to said shaft by means of a spline 269$^a$ being longitudinally adjusted thereon by means of the bracket extension 262, in the manner above explained, causing that member to slide with the bracket as the latter is adjusted.

It will therefore be seen that as the cams 268 and 269 rotate with the main shaft as their high portions contact the roll 266 of the horizontal plates 260 which are immediately over the said cams, they will cause said plates 260 to be elevated into the position shown in Figs. 6 and 7, where said nailing plates 260 are shown to have forced the plungers into all of the bottom chucks to the limit of their stroke so that they have driven the nails contained therein if such had been previously fed into the chucks. The nailing plates 260 as they rest upon their respective actuating cams 268 and 269 are held in contact therewith by the action of gravity and, accordingly, as the said cams rotate those plates, they are thereby brought to rest upon the low part of said cams, thereby returning the plates preparatory to driving a new lot of nails as they are again carried upwardly.

The superficial area of the respective nail plate 260 is designed to extend both laterally and longitudinally the full width and length of possible adjustments of the bottom chucks, or more particularly described, with reference to the various positions occupied by the side bottom-chucks 210, as the end bottom-chucks 205 only receive lateral adjustment in reference to the plate, which is necessarily always confined within the limits of the side bottom chucks. The side bottom-chucks, however, are slidably supported upon extensions as has been pointed out which reach from either end of the box to practically the middle portion thereof, and these extensions of the chucks supported thereon may laterally be removed with the brackets 22 and 23, when adjusted to different widths of box, which movement of the brackets 22 and 23 is accompanied by a corresponding movement of the nail plates 260.

Upon the rock shaft 256 is a cam 280 which has upon the side cam surface 281, against which bears the cam roll 282 upon one end of the lever 283, which is suitably supported upon a bracket 284, attached to the under side of the right hand chute casing 216, said lever having been pivotally secured to said bracket by means of a stud 285. The lever 283 is connected by means of a link 286 to a telescopic rod 287$^a$ connecting the reciprocating slides 218, which are thereby adjustably attached one to the other in their end to end arrangement at the bottoms of the respective chutes 219, so that as the casings 216 are separated in the process of adjusting the brackets 21 and 24 respectively, the connecting rod 287ª may be operably connected at the various adjustments. The shaft 256, having cam 280 is partially rotated by means of its lever arm 272ª connected by a pitman rod 272ᵇ to a crank 272ᶜ upon countershaft 76ª which is operably connected by means of sprockets to the line shaft 10, and therefore rotates continuously therewith. Hence, a continuous vibratory motion is carried to the rock shaft as described so that as the nail hoppers are being constantly rocked to supply the nails to the tops of the chutes 216, simultaneously through action of the reciprocating slides 218, a single nail is taken from the bottom of each of the slots in said chute.

Adjusting mechanism.

It is seen that the adjustable brackets 21, 22, 23 and 24, which constitute the sectional framework of the machine, have attached thereto various supporting and actuating parts that relate to the forming and nailing of boxes, and it has been pointed out in connection with the description of certain of the devices so related to said brackets and supported thereon that provision has been made for retaining the said parts in their relative operable connections thereon, during the various adjustments of said brackets. It therefore remains to describe with more particularity, additional features of the process of adjustments of said various parts relative to the modification and movement of the respective brackets 21, 22, 23 and 24 of the adjustable frame work which form the basis of my machine.

Upon the guide rails 6 and 7 of the stationary frame are attached, in a manner already described, bracket guiding bed plates 120 and 121, which have upon their surfaces the guideways 120ª and 121ª, upon which the brackets 22 and 23, those at the front of the machine, are adapted to slide to and from the corresponding brackets 21 and 24 respectively, at the back of the machine which latter in the preferred embodiment are relatively fixed in their position upon said bed plates 120 and 121.

Therefore, in order to adjust the brackets 22 and 23, with reference to their corresponding brackets 21 and 24, I have provided for said movable brackets 22 and 23 the twin screws 22ª, one of said screws in each of said brackets, which screws are journaled in the elbow brackets 22ᵇ supported at the front ends of the respective bed plates 120 and 121. The screws 22ª are held against longitudinal thrusts in either direction by means of collars 22ᶜ on the one side of said bracket bearings, the miter gear at the outer end of each of said screws bearing upon the opposite side of said supporting journaled brackets. Each of said screws enters a correspondingly threaded socket 22ᵈ in the front face of a corresponding bracket 22 or 23, so that as the screws 22ª are rotated the brackets 22 and 23 are caused to slide in one direction or the other along their respective bed plates 120 and 121, in accordance with the direction in which the screws are rotated. In order to control the simultaneous rotation of said screws I provide a connecting shaft 22ᵉ supported in the journals 22ᵇ of said elbow brackets supporting said screws, upon which connecting shafts are miter gears 22ᶠ in mesh with similar gears at the end of each of the twin screws 22ª. At the outer end of the shaft 22ᵉ is a hand wheel 22ᵍ by means of which the shaft 22ᵉ may be manually rotated, simultaneously turning the twin screw so as to move their corresponding brackets laterally to the same extent as may be required, in adjusting to different widths of boxes. The miter gears relating to the screws 22ª of the bracket 23 are slidably attached to the connecting shaft 22ᵉ so that the miter gears are adapted to be adjusted therewith as the brackets 23 and 24 upon the guide bar 121 are moved in the opposite direction in order to vary the length of the box.

As already described, while the guiding bed plate 120 in the present form of my invention is relatively fixed in its position upon the guide rails 6 and 7, the corresponding bed plate 121 is adapted to slide along said guide rails, carrying its super-imposed brackets 23 and 24, to various adjusted positions.

The means therefore, for adjusting said movable brackets 23 and 24 with reference to the brackets 21 and 22, in order to vary the length of box to be made thereby, comprises a second pair of twin screws 23ª which are adapted to fit into correspondingly threaded sockets 23ᵇ, in the brackets 23ᶜ attached at the respective ends of the transverse slidable bed plate 121. The twin screw shafts 23ª are rotatably supported in journaled bearings supplied by the two fixed brackets 23ᵉ one at the front and one at the back of the machine, extending laterally from the guide rails 6 and 7 upon the main frame in axial alinement with corresponding brackets 23ᶜ and said screw shafts 23ª are held against longitudinal movement therein, by means of collar 23ᶠ bearing against one end of each of said journals, and a miter gear 23ᵍ bearing against the opposite end thereof.

The connecting shaft 24ª suitably connected in the bearings 24ᵇ of the elbow brackets 22ᵈ, by means of the miter gears 24ᶜ oppositely disposed thereon, and in mesh with the corresponding miters on the screw shafts 23ª, causes them to rotate similarly thereby carrying to its required adjustment, the hand wheel 24$^d$, being conveniently provided at the outer end thereof for the purpose.

It has already been seen that as the brackets 22 and 23 move forward and back they carry with them the corresponding outer walls and the supports of the shooks forming the ends 25 of the box. Also the nail mechanism and forming parts relative to the outer side of the box to be formed thereon are likewise carried to the same relative position as also the actuating cams of the various parts related therewith are simultaneously moved in accordance with the adjustments thereof, preserving the various relative positions of corresponding parts, similarly the parts relating to the side shooks 26 and bottoms 27 are simultaneously adjusted to various lengths of box by means of the adjustment above described with relation to the brackets 23 and 24 on the guide bar 121. It remains to be pointed out that the shafts 35, 36, 37, and 38 which carry the chuck assembling and nailing mechanisms have their actuating walls and cams splined to said shafts so that as the said brackets 22 and 23 are moved relatively to brackets 21 and 24, and likewise when the brackets 23 and 24 are moved relatively to the brackets 21 and 22, said walls and the cams upon said shafts are similarly carried along with the various accompanying mechanisms of said box. Likewise as has already been pointed out, the cams on the transverse rock shafts 117 and 256 are caused to move longitudinally of said shafts, as the brackets 22 and 23 are moved and adjusted to different widths of box in the manner described, and by like means the sleeve 265, which carries the various cams relating to the nailing plates of the end chucks is slidably adjusted upon this splined connection to the main shaft 10, in retaining its original relation to the lever connection therewith.

Operation of machine.

To operate the machine described in the foregoing specifications, the parts are brought into adjustment in accordance with the size of the box to be made, which is conveniently accomplished by placing a bottom piece, or one of the side pieces within the hopper to which it relates, and then turning the hand wheel 24$^d$ on the shaft 24$^a$ which connects with twin screws 23$^a$ thereby causing the bed plate 121 to move upon the rails 5 and 6 of the supporting frame 1 until it is seen that the vertical edges of the bars 70 and 71 of the hopper for the bottoms, or the guide plates 30 of the hoppers for the side pieces are brought up to the respective ends of the shook contained therein. Similarly by placing an end piece 25 upon the bars 33 at either end of the machine, and turning the shaft 22$^e$ which connects with twin screws 22$^a$, the brackets 22 and 23 are moved in the direction of the corresponding brackets 21 and 24, drawing the plates 30 of the hoppers for the respective end pieces into similar relationship with the edges of the shook 25 in the manner described in connection with the said pieces 25. In the adjustment thus attained, the brackets 22 and 23 are locked upon the bed plates 120 and 121 by turning the hand bolts 22$^g$, the slidable bed plate being in turn similarly secured against further slidable movement on the guide rails of the frame by means of the hand bolts 23$^h$ suitably threaded in the respective ends of said bed plate 121.

In thus adjusting the bed plate 121 to the length of the box to be made it carries with it the brackets 23 and 24 which are supported thereupon, and also the sub-brackets 118 depending from said bed plate to support the shaft 116; the bed plate 121 in being slid to an adjustment by means of another depending bracket 263 removes the sleeve 265 along with the brackets 23 and 24. Furthermore, as the brackets 22 and 23 have been removed on their corresponding bed plates 120 and 121, they carry with them in like manner the cam lever arms 112 and 113 and similarly the nailing plates 25 relating to and supported upon the brackets 22 and 23, respectively, are carried along in the process of adjustment with those brackets; and thus also the left hand vertical nailing plates 262 are maintained in proper relation with the brackets 23 and 24, they being carried in the process of adjustment along with the transverse bed plates 121 upon which said brackets are slidably supported.

The respective hoppers having been adjusted thereon in accordance with the length of the shook, the rear standards 29 of all the hoppers are thereupon by means of their thumb-screw adjustment slid along the walls of the guard plates 30, until said standards contact the outer edge of the shook lying within the hoppers upon the bars 33; and similarly the standard 29 is brought up against the bottom piece upon the grooves 70$^a$ and 71$^a$ and secured at that point of contact. The hoppers having been thus adjusted they are supplied with shooks of even length therewith, of uniform dimensions corresponding to each side piece and bottom to be handled thereby, and the machine is thus brought into readiness to begin the manufacture of boxes from the shooks as arranged therein, nails of suitable size having been supplied to the nail selecting hoppers 270, keyed to the rock shaft 272, that is supported upon the posts 276, and I will now briefly describe the operations of the several mechanisms some of which work synchronously and others consecutively.

Assuming the normal positon of rest of the parts of the machine as a whole to be that illustrated in Figs. 2, 6, and 7, in which the various shook ejecting pawls are held in their respective chains each in a position from which it will eject a shook from the bottom of its respective hopper whereupon the line shaft begins to rotate in the direction of the arrow shown in Fig. 6, and through the action of the cam 51 on the bar 47, causes the shafts 35, 36, 37 and 38 to rotate, the similar shock ejecting sprockets 40 carrying their sprocket chains 41 toward the center of the machine thereby causing their respective pawls 43 upon reaching the hoppers to which they relate, to force the lowermost shook therein contained along their respective supporting bars 33 into a position which is directly over the tilting bars 55, which lie horizontally alongside of the bars 33 until the pawls 43 have approached their outer ends. Thereupon, the hooked projections 59 upon the hubs of the shook ejecting sprockets 40 having been carried into contacting relationship with the studs 60, the bars are thereby drawn longitudinally outwardly, causing the tilting arms 55 to turn their respective shooks 25 and 26 upon their edges. In the process of tilting the shooks, the outer edges thereof resting upon the bars are engaged by the presser fingers 65, pivotally bracketed upon each of the hoppers 28, as the bars 55 rise to the vertical position shown in Fig. 11, so that the fingers 65 will force the shook downwardly into the position shown there where its opposite ends rest vertically against the side of the forming arms 101, 102, 103 and 104.

While the chains 41, and their pawls 43 are thus carrying the sides and ends from their respective hoppers forward to the forming arms, the sprocket chain 73 is being driven by means of its sprocket connection with the main shaft to carry its pawl 72 into similar contact with the outer edge of the lowermost bottom piece 27, which rests with its opposite ends upon the bars 70 and 71 respectively. The pawls 72, as they eject a bottom piece from the hopper, carry the shook only about one half the distance to the forming mechanism, delivering it immediately in front of a second set of pawls 80 which move forwardly in the same direction and at the same time as the pawls 72, and being located back of the point to which the said pawls 72 transmit the end shook from the hopper, the pawls 80 will carry the shook which has been thus delivered to them into a position immediately under the arms 101, 102, 103 and 104, said pawls 80 being operably connected with the sprocket chains 82. Inasmuch as the bottoms thus move in stages from their hopper to the forming center, it will be apparent that before making the first box of a series, it will be necessary to place a shook 27 upon the guideways 70ᵃ and 71ᵃ immediately in front of the pawls 80. As the shook thus placed is carried under the forming arms another is brought from the hopper to take its place by action of the pawls 72 and this order followed.

The bottom shook ejecting chains are carried forward in the manner described by means of their connection at the front of the machine with sprocket wheels 83, which are suitably mounted upon the shaft 83ᵃ, one of the chains 82 being connected at its outer end to the bent lever 84, pivotally supported upon the bracket 85 on the frame of the machine, said lever having the cam roll 86, which runs upon the periphery of the egg-shaped cam, upon the main shaft 10.

The main shaft 10 which has thus been driving the parts that advance the shooks to the forming mechanism, immediately following said action causes the forming arms to descend from the position shown in Figs. 10 and 11 to the position shown in Figs. 5 and 7, that is, from the upper to the lower level to complete the forming process within the same time that it causes the shook actuating parts to return to their normal positions. This lowering of the forming arms is accomplished through the action of the cams 122 and 123 on said shaft, through the respective levers 111, 112, 113 and 114 connected therewith, which operate the vertical slides 106 to cause the inside forming arms 101, 102, 103 and 104, which are attached through the goose-neck brackets 105, to respective vertical slides 106, to descend from the assembling to the forming levels as described.

The forming arms carry the box frame, composed of the pieces 25 and 26 down with them, and place the frame upon said bottom piece 27 immediately upon the latter setting back into place as above described, by means of the proper timing of the cams 122 and 123 with reference to the rotation of the cam 268 which actuates the lever 85 that controls the bottom advancing pawls 72 and 80. Thus the high portion of said cam 268 is brought into position to carry the roll 86 to the extreme lowermost position of said lever 84, slightly in advance of the corresponding high points of said cams 122 and 123, having operated to bring the slides 106 to their bottom positions, thereby advancing the bottom 27 which has been carried laterally along the bars 70 and 71 by means of the pawl 82ᵃ upon the chains 82. Hence it will be seen that the bottoms 27 will be brought into the position beneath the forming arms immediately in advance of their reaching their lowermost position, as illustrated in Figs. 6 and 7.

It has been explained that the tilting arms 55 pertaining to the sides 26 operate slightly in advance of those which turn the end pieces 25 into place, thereby causing each of the latter to be pressed against the adjacent ends of the two side pieces, and that as the four sides and end pieces are thus arranged, they are held temporarily in the form of a box frame upon the four forming arms 101, 102, 103 and 104 by presser levers $55^a$ on the tilting levers bearing against one of the end pieces 25. In this condition the box frame is carried down to be similarly engaged by the presser-levers 130 on the outer forming members 131, 132, and 133, 134 which also press against the same end piece 25, which had been held against the forming arms as just described, until the frame is placed upon the bottom pieces 27. While the frame composed of the end pieces is thus descending to the lower level the respective sides and ends are being held outwardly against the corresponding angular faces of the outer forming members 131, 132, 133 and 134, by the action of the compression springs of the forming arms 101, so that the superior spring action of the respective compression springs that are adapted to force the outer forming members in a direction oppositely to the action of the springs of the folding arms, causes the sides 26 to be carried to the respective ends of the ends 25, and remain flush with the outer edges thereof.

Hence as the pawls 80 in the chain 82 carry the bottoms 27 beyond the detents 142 yieldingly pivoted at the bottoms of the plates $131^c$ and $134^c$ respectively, into contact with the latches 140, the members 132 and 133 are carried against their respective compression springs $135^b$ until the bottom advancing mechanism recedes, whereupon those springs carry back the said members which in turn force the frame composed of side and end pieces back against the oppositely disposed faces of the outer forming members 131 and 134, at the same time carrying the bottom back until its rearmost edge contacts the said pivoted detents 142, the shook contacting ends of which are in line with the corresponding inner faces of the side guiding plates $131^c$ and $134^c$ of the rear forming members. As the latches 140, which contact the forward edge of the bottom piece 27, are in similar alinement with the corresponding side guiding faces $132^c$ and $133^c$ of the front forming members, it will therefore be apparent that when the bottom piece has thus been carried against the said rear detents the side pieces 26 will be in perfect alinement with the edges along both sides of said bottom piece 27.

As the bottom is advanced along the grooves $70^a$ and $71^a$, its respective ends, engaging with the outer vertical guiding ledge of said grooves, will cause the yielding horizontal bar 71 to conform to the relative shape of the bottom piece that is being thus advanced, which bar 71, it has been seen, is normally held in parallel with its complemental bar 70 by means of the two compression springs $71^b$. Furthermore, as the bar 70 shifts, thus to accommodate itself to whatever irregularities may exist in the conformation of a bottom, that member 71 will also cause the outer forming members 133 and 134, the lower ends if which are slidably attached thereto, to maintain a forming position in accordance with such modified position of said bar, with the result that the frame of the box, which has thus been brought from the upper assembling level, as it is guided in its descent by said outer forming members, will be made to conform to the exact shape of the bottom 27, whether it be a perfect rectangle in form, or more or less modified from such regular shape.

Having thus completed the box forming operations, the nail driving plates 250 and 260 which have at this point been withdrawn to their respective outer positions, the former by action of the springs $111^d$, the latter by gravity, are immediately driven in the direction of their respective nail chucks, the vertical nail driving plates 260 being elevated by the operation of their respective egg shaped profile cams 268, 269 upon the main shaft, and the longitudinal nail driving plates being simultaneously forced in the direction of the chucks thereinto related by means of their vibrating lever arms 257, likewise, actuated by cams 259 upon said shafts.

While the nail driving plates are operating upon their nail driving chucks, the cams 122 and 123 on the main shaft, by means of dwells suitably provided thereon cause the forming arms 101, 102, 103 and 104 to be held in the position shown in Figs. 6 and 7 until the nails have been driven into the box, whereupon these cams immediately begin to actuate their respective levers in the opposite direction with the result that the forming arms 101, 102, 103 and 104 are again raised to the upper level of the mechanism to receive a new lot of side and end shooks 25 and 26.

While the nailing mechanism is thus operated, and the forming arms are being held in place in the manner indicated, the line shaft is rotated continuously causing the sprocket chain 73 to complete its revolutions and likewise to allow the bent lever arm 84 to return to its uppermost position shown in Fig. 6, permitting the torsion spring 80ᵇ to return the sprocket chains 82 to their normal position of rest while their pawls 80 are thereby brought to their position of rest, as shown also in Fig. 6.

While the foregoing operations are taking place, the nail containing hoppers are being rocked simultaneously precipitating their nails through the bottom grooves into corresponding nail conducting walls in the nail chutes, by the following means: The rock shaft 272 upon which the nail selecting hoppers 270 are operably attached, and are rocked forward and back once for each rotation of the line shaft, by means of the crank and rod connection with the countershaft 76ᵃ, which has a sprocket and chain connection to rotate pivotally with the line shaft. Upon the rock shaft 272 that carries the nail hoppers is a cam 280 which is connected by a lever with a nail selecting slide which makes a complete reciprocation with each rocking motion of said rock shaft, so that with a rotation of the line shaft, by means of which a nail is driven by each nail chuck, another nail is selected and by means of tubes 215, conducted from the hopper down to the nail driving chucks.

Similarly timed to the rotation of the line shaft is an air driving device which introduces an air blast into the nail selecting tubes 215, immediately after the reciprocating slide has selected and introduced into said tubes the nails, in the manner described, so that immediately after each nail has been introduced into said tubes, the blast is turned into them at a point back of that in which the nail has been transferred to the tubes, so that the nails will be carried into the chucks, said blasts having been made continuous to operate upon the nails in the chucks, by means of the suitable timing of the rotary pressure controller 230, until the plungers have been carried into the position of driving the nails into the wood.

Having described my invention, what I claim is:

1. In a machine for making boxes, said boxes having a frame portion comprising end and side pieces, a forming device comprising parallel arms similarly suspended in rectangular arrangement, assembling means comprising members for placing said side pieces laterally against oppositely disposed arms of said forming device with said end pieces bearing against the respective ends of said side pieces on said arms, and means for holding said end pieces thereon comprising yielding presser bars upon said assembling members.

2. In a machine for making boxes, said boxes having a frame portion comprising end and side pieces and a bottom piece thereon, assembling means for forming said frame from said end and side pieces comprising shook ejecting and shook tilting mechanisms: means for placing said frame upon said bottom piece comprising inside forming arms and outer forming guide members adapted to hold the pieces comprising said frame in alinement relatively to their adjacent ends, and means for holding the end piece upon the respective ends of said side pieces, comprising two sets of presser levers, one of said sets operably attached to said tilting mechanism and the other of said sets attached to said outer forming members, substantially as and for the purposes shown.

3. In a machine for making boxes, said boxes having a frame portion comprising side pieces and end pieces resting laterally against the ends of said side pieces, and a bottom piece thereon, assembling means for forming said frame upon said side and end pieces, comprising a plurality of tilting levers disposed in opposite pairs; means comprising yielding presser-bars pivotally attached to said tilting levers adapted to hold said end pieces against the respective ends of said side pieces; means for placing said frame upon said bottom piece, comprising an inside forming device; means for lowering said forming device upon said bottom piece, comprising outer guiding members adapted to guide said side and end pieces upon said forming arms; and means for similarly holding said end pieces upon the respective ends of said side pieces within said outer guiding members, comprising yielding presser-bars pivotally attached to said outer guiding members, substantially as and for the purposes shown.

4. In a machine for making boxes, said boxes having a frame portion comprising end and side pieces and a bottom piece thereon, means for forming said frame comprising an inner and an outer forming mechanism, said outer mechanism comprising four upright guide plates having angular faces and said inner mechanism having four parallel forming arms and four corresponding guiding plates, said arms arranged in rectangular form and supported yieldingly at their ends and adapted to travel longitudinally within said angular faces, said guiding plates also yieldingly attached at their ends, the respective members of said inner and outer mechanisms being adapted to hold respective ends of the end and side pieces composing said frame between the angular faces therof, said outer plates being normally forced in the direction of said inner members.

5. In a machine for making boxes, said boxes having a frame portion comprising end and side pieces and a bottom piece thereon, means for forming said frame, comprising an inner and an outer forming mechanism, said inner mechanism comprising four parallel forming arms and four corresponding guiding plates, said arms disposed in rectangular arrangement and yieldingly attached at their upper ends to corresponding slides, said outer forming mechanism comprising four angular members yieldingly attached at their tops to the framework of the machine, and means for reciprocating said forming arms longitudinally within said four angular members.

6. In a machine for making boxes, said boxes having a frame portion comprising end and side pieces, and a bottom piece thereon, a nailing mechanism, a forming mechanism comprising an inside forming device having four parallel arms with yielding extensions on said arms, hoppers containing end and side pieces, means for transferring individual sides and ends from said hoppers to said forming device, means for holding thereon said ends and sides, means comprising said forming device, for conveying said side and end pieces to said nailing mechanism.

7. In a machine for making boxes, said boxes having a frame portion comprising end and side pieces and a bottom piece thereon, a nailing mechanism; a forming mechanism comprising an inside forming device having four parallel arms and yielding extensions upon said arms, said extensions having shook contacting faces in operable alinement with corresponding faces of said parallel arms; hoppers containing end and side pieces; means for transferring individual side and end pieces from said hoppers to said forming device, comprising tilting levers; means for holding thereon said ends and sides comprising presser levers; means comprising said forming device and cam actuated sliding members for conveying said side and end pieces upon said forming arms to said nailing mechanism; means for conveying said bottoms to said nailing mechanism in advance of the action of said cam and sliding members in conveying said frame to said nailing mechanism; and actuating means for depressing said arms, whereby said extensions are caused to yield as said frame is placed upon said bottom piece, substantially as and for the purposes shown.

8. In a machine for making boxes, a box forming mechanism comprising an inside forming device, oppositely disposed hoppers containing sides and ends and a hopper containing bottoms; means for transferring individual sides and ends from said hoppers to said forming device; means for holding said sides and ends in rectangular arrangement thereon, nailing mechanism; means for conveying the sides and ends thus arranged to said nailing mechanism; means for conveying said bottoms from said hoppers into said nailing mechanism in advance of the sides and ends being conveyed thereto; means for positioning said bottoms relatively to said sides and ends; and means for nailing said ends, sides and bottoms in substantially the same relative position in which they are delivered to said nailing mechanism.

9. In a machine for making boxes, having side pieces, end pieces and a bottom, a series of hoppers containing the said side pieces upon one plane, a hopper containing the bottoms upon a different plane; means for carrying assembled side pieces to the plane upon which said bottoms are held; means for conveying said bottoms and said assembled sides into a nailing mechanism; means so arranged that said bottoms are introduced into said nailing mechanism slightly in advance of said assembled sides being introduced therein; means for feeding sides in advance of ends; and means for simultaneously nailing said sides together and said bottoms to said sides.

10. In a machine for making boxes, said boxes having a frame composed of sides which overlap the ends constituting said frame, hoppers containing said side and end pieces arranged relatively in the same operable plane; means for assembling said side and end pieces comprising parallel arms; means for delivering a portion of said pieces to said forming arms slightly in advance of others of said pieces; means for removing said forming mechanism with said assembled pieces to another plane; hoppers containing bottoms upon said other plane; means for delivering said bottoms to said arms; and means for registering said bottoms in connection with said assembled pieces comprising said frame.

11. In a machine for making boxes, said boxes having a frame with side and end pieces and a bottom piece thereon, means for assembling simultaneously said side and end pieces upon a flexible forming device, means for delivering said frame to said bottom piece, flexible means for accurately registering said bottom in connection with said frame, and means for nailing the parts thus assembled and registered.

12. In a machine for making boxes, said boxes having a frame portion with end and side pieces and a bottom piece thereon, compensating means for holding side and bottom pieces of variable dimensions comprising said frame, comprising oppositely disposed forming members and actuating members for delivering said frame upon said bottom piece, said holding means also comprising angular guiding members, a portion thereof having angular guide walls rigidly attached thereto and a portion thereof having similar guide walls hinged thereto; means comprising a locking device for holding said hinged guide walls in said angular members while the box is being guided thereby; means for nailing said ends to said sides and for nailing said bottoms thereon to form a box; means for withdrawing said forming members from the frame after delivery upon said bottom; means for releasing said locking device as said forming members are withdrawn; and means for ejecting said box comprising mechanism for swinging said hinged guide walls outwardly as the box is ejected, substantially as described.

13. In a machine for making boxes, said boxes having a frame with side and end pieces and a bottom piece thereon, nailing chucks; means for assembling said side and end pieces comprising a forming device having four parallel arms disposed in rectangular form around which arms said end and side pieces are placed to form said frame; means for advancing said forming device to said bottom piece, comprising angular members having plates supporting said chucks and shook guiding walls, a portion of said guide walls being rigidly attached to corresponding chuck-supporting plates, and a portion of said guide walls being hinged to others of said plates; means comprising a locking device adapted to hold said hinged members in angular relationship with the plates to which they are attached while the box is being guided thereby; means for nailing said ends to said sides and said bottom thereon to form a box; means for withdrawing said forming device and releasing said locking device; and means for ejecting said box, comprising means for swinging outwardly said hinged guide walls as the box is ejected therefrom.

14. In a machine for making boxes, said boxes having a frame portion with end and side pieces and a bottom piece thereon, means for holding said frame comprising oppositely disposed forming members, each of said members having angular plates with inner faces adapted to contact with the respective ends of said side and end pieces; nailing chucks arranged longitudinally within one of the plates of each of said forming members, a portion of said forming members having their angular plates rigidly secured together, and a portion thereof having the said plates hinged thereon, wherein the said members having hinged plates are oppositely disposed relatively to said members having rigidly secured plates; means for holding bottom pieces comprising yielding detents pivoted to such fixed plates; means comprising recessed bars for guiding said bottom pieces into engaging relationship with said forming members; shook advancing means; and yielding means adapted to force said hinged forming members oppositely to the direction of said advancing means.

15. In a machine for making boxes having a frame portion with end and side pieces and a bottom thereon, means for forming said frame comprising members having angular plates with inner faces adapted to contact with the respective ends of said side and end pieces; means comprising recessed bars for guiding said bottom pieces into engaging relationship with said forming members; laterally yielding devices on a portion of said members and yielding sliding devices on other of said members, for registering the edges of said bottom pieces with corresponding inner faces of said angular plates; nailing chucks adjustably supported within an angular face of each of said forming members; and means for laterally adjusting either of said forming members relatively to the chuck bearing plate thereof, substantially as described.

16. In a machine for making boxes having a frame portion with end and side pieces and a bottom piece thereon, means for forming said frame comprising forming members each having angularly disposed plates with inner faces adapted to contact with the respective ends of side and end pieces, means for nailing comprising nailing chucks adjustably arranged in one of said plates in each of said forming members, means for registering the edges of said bottom pieces with corresponding inner faces of said angularly disposed plates comprising laterally yielding detents upon corresponding plates of a portion of said angular members, sliding devices yieldingly supported upon plates of other angular forming members, means for advancing said bottoms beyond the point of contact with said detents, and means comprising compression springs for forming sliding devices in the direction of said detents.

17. In a machine for making boxes having a frame portion with end and side pieces and a bottom piece thereon, means for forming said frame comprising members having angular plates with inner faces adapted to contact with the respective ends of said side and end pieces, means comprising recessed bars for guiding said bottom pieces into engaging relationship with said forming members, means for registering the edges of said bottom pieces with corresponding inner faces of said angular plates; means comprising nailing chucks for driving nails transversely through the end pieces into the adjacent ends of the side pieces, means for holding said chucks in one of the plates composing said angular forming members, and means for adjustably holding the other of said plates in alinement with said chucks.

18. In a machine for making boxes having a frame comprising end and side pieces and a bottom piece thereon, angular forming members in rectangular arrangement at the respective corners thereof, each of said angular forming members having guiding plates at right angles to each other; means for forming said frame within said forming members; yielding means for pressing the respective ends of said side and end pieces against the inner faces of said angular plates; means comprising horizontal recessed bars for conducting said bottom pieces into engaging relationship with said angular forming members; means for engaging said bottom pieces, comprising laterally yielding detents pivotally attached at the bottom end of corresponding oppositely disposed angular plates of said forming mechanism, the inner shook contacting faces of said detents operably disposed within the planes of inner faces of said plates; means for advancing said bottoms along said recesses beyond said detents into engaging relationship with stops on said plates oppositely disposed thereto; and spring yielding means for returning said bottoms against the contacting ends of said detents.

19. In a machine for making boxes, said boxes having a frame portion comprising end and side pieces and a bottom piece thereon, an assembling mechanism comprising a sliding device, means for forming said frame comprising an inner and an outer forming mechanism, said inner mechanism comprising four parallel arms disposed in rectangular arrangement and yieldably attached at their upper ends to said sliding device, said outer forming mechanism comprising four upright angular members pivotally attached at their tops to the framework of said assembling mechanism and two horizontal members to which a portion of said upright members is slidably and yieldably attached at their bottom ends, said horizontal members having guiding recesses into which are adapted to fit the respective ends of said bottom pieces; means for moving one of said members relatively to the other thereof; means for conveying said bottom pieces into and along said recesses; means comprising compression springs suitably disposed at the respective ends thereof, for holding one of said horizontal members normally in parallel alinement with the other of said members; means for holding said upright members in operable relationship with said movable horizontal member whereby the end pieces guided by such vertical members are brought into registration with the corresponding ends of the bottoms within the respective recesses of said movable horizontal member.

20. In a machine for making boxes, said boxes having a frame portion comprising end and side pieces and a bottom piece thereon, an assembling mechanism comprising a sliding device, means for forming said frame comprising an inner and an outer forming mechanism, said inner mechanism comprising four parallel arms disposed in rectangular arrangement and yieldably attached at their upper ends to sliding means, said outer forming mechanism comprising four upright angular members pivotally attached at their tops to the framework of the assembling mechanism and two horizontal members to which a portion of said upright members is slidably and yieldably attached at their bottom ends, said upright members having guiding recesses into which are adapted to fit the respective ends of said bottom pieces; means for conveying said bottom pieces into and along said recesses; means comprising compression springs suitably disposed at the respective ends thereof for holding one of said horizontal members normally in parallel alinement with the other of said members; means for holding said bottoms within said guiding recesses in corresponding registration with said vertical members, comprising detents attached to the rear pair of said vertical members and latches provided on said front vertical members, and spring yielding means for moving said forward members in the direction of said rear members substantially as described.

21. In a machine for making boxes, said boxes having a frame with side and end pieces and a bottom thereon, means for assembling substantially simultaneously said side and end pieces upon a forming device, means for carrying said frame downwardly to a bottom piece to be nailed thereon, means for simultaneously nailing said sides and said bottoms wherein the nails entering said bottom are driven vertically upward, and the nails in said frame are driven horizontally.

22. In a machine for making boxes, assembling means adapted to form a box preparatory to nailing the same, wherein said box rests formally upon its bottom; means for holding the pieces assembled to form said box upon said bottom, comprising inside forming members and outer guiding and forming members; means for operably holding said walls in guiding position comprising springs and locks adapted to coöperate therewith; means for nailing said box in said position within said outer forming members; and means for ejecting said box from said forming members comprising hinged guiding walls thereon.

23. In a machine for making boxes, means for assembling the pieces composing the box to be manufactured thereby, means for nailing said box, comprising nailing chucks; means for selecting individual nails and conducting said nails to said nailing chucks, said selecting and conducting means comprising tubes; in combination with pneumatic means for forcing said nails through said tubes and holding them in said nailing chucks preparatory to being acted upon thereby.

24. In a machine for making boxes, a mechanism for forming and holding the sides composing the manufactured box; means for selecting, conducting and driving individual nails, comprising pneumatic means for holding said nails while driving them into said box; and means for adjusting the forming and nailing mechanisms in accordance with the shape and dimensions of the respective pieces composing said box.

25. In a machine for making boxes, means for assembling the sides and ends into a frame; means for nailing said ends to sides and said bottom thereon comprising nail selecting, conducting and driving mechanisms; means for introducing air pressure into said nail mechanism whereby said nails are advanced and sustained to be acted upon by the driving mechanism; and means for controlling the timing of the correlated and the successive operations of said mechanisms.

26. In a machine for making boxes, means for assembling pieces to form a box, means for nailing said assembled pieces comprising nail selecting and nail driving means, pneumatic means for conveying the nails selected thereby to said driving means, and means for controlling the pneumatic pressure in the intensity and in the timing thereof with relation to the predetermined requirements of the nailing mechanisms to be employed therewith.

27. In a machine for making boxes, a supporting frame having thereon oppositely disposed sections of a superimposed sectional frame structure; means attached to said sectional frame for supporting pieces for making boxes; a forming mechanism and means for assembling said pieces thereon; means for holding said assembled pieces in the form of a manufactured box; means for selecting and driving individual nails; means for conducting said selected nails to said driving means; means comprising nail plates for driving said nails; means whereby said assembling, said forming, and said nail driving mechanisms are suitably supported upon oppositely disposed sections of said superimposed frame structure; and means for moving said mechanisms adjustably with said sections, whereby said mechanisms may retain a fixed relationship throughout successive adjustments.

28. In a machine for making boxes, a supporting frame having its parts in fixed relationship, a superimposed sectional frame structure comprising movable brackets having attached thereto hoppers for storing pieces from which boxes are made, means for adjusting the width of said hoppers so that the hoppers containing the sides and the bottoms are simultaneously adjusted in accordance with the length of the box to be made thereby, means for adjusting the width of hoppers containing the ends of said box whereby the hoppers containing the two ends thereof are simultaneously adjusted in accordance with the width of said box, and independent means for adjusting the end hoppers and the hoppers containing sides and bottoms.

29. In a machine for making boxes, a frame having its parts relatively fixed; a superimposed frame structure having sectional members comprising movable brackets; hoppers containing side and end pieces having their respective ends supported upon different sectional members of said superimposed structure; means for assembling said pieces attached to different members of said sectional structure; box frame forming means; nailing means similarly attached to brackets composing said sectional members; means for adjusting said supporting, said assembling, said forming and said nailing means simultaneously to varying lengths and widths of boxes to be made thereby, and means for simultaneously adjusting two of said brackets relatively to their oppositely disposed pairs of brackets.

In testimony whereof, I have hereunto set my hand in the presence of two subscribing witnesses.

ROBERT CASSELLMAN NEFF.

Witnesses:
EDNA X. LEE,
ANNA W. DILLMAN.

Copies of this patent may be obtained for five cents each, by addressing the "Commissioner of Patents, Washington, D. C."